(12) United States Patent
Ding et al.

(10) Patent No.: US 12,483,476 B2
(45) Date of Patent: Nov. 25, 2025

(54) SLICE CONTROL METHOD AND APPARATUS

(71) Applicant: HUAWEI TECHNOLOGIES CO., LTD., Guangdong (CN)

(72) Inventors: Hui Ding, Xi'an (CN); Zhuoming Li, Xi'an (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 543 days.

(21) Appl. No.: 17/853,657

(22) Filed: Jun. 29, 2022

(65) Prior Publication Data
US 2022/0338106 A1 Oct. 20, 2022

Related U.S. Application Data

(63) Continuation of application No. PCT/CN2020/104980, filed on Jul. 27, 2020.

(30) Foreign Application Priority Data

Dec. 30, 2019 (CN) .......................... 201911404788.1

(51) Int. Cl.
H04L 41/0894 (2022.01)
H04L 41/00 (2022.01)
(Continued)

(52) U.S. Cl.
CPC .......... *H04L 41/0894* (2022.05); *H04L 41/00* (2013.01); *H04L 41/0896* (2013.01);
(Continued)

(58) Field of Classification Search
CPC ....... H04W 48/16; H04W 4/50; H04W 76/10; H04W 48/18; H04W 24/02; H04W 76/27;
(Continued)

(56) References Cited

U.S. PATENT DOCUMENTS

2019/0053104 A1\* 2/2019 Qiao ..................... H04W 28/24
2019/0215730 A1 7/2019 Qiao et al.
(Continued)

FOREIGN PATENT DOCUMENTS

CN 106488467 A 3/2017
CN 107734708 A 2/2018
(Continued)

OTHER PUBLICATIONS

Generic Network Slice Template, Version 1.0, GSM Association; Official Document NG.116—Generic Network Slice Template, May 23, 2019, total 60 pages.
(Continued)

*Primary Examiner* — Nimesh Patel

(57) ABSTRACT

A slice control method and apparatus are provided. The method includes: a policy control network element receives, from a slice access control network element, slice access status information of a network slice, the slice access status information comprises information indicating a network slice traffic bandwidth of the network slice; determines, based on the current slice access status information of the network slice, that the network slice traffic bandwidth exceeds a corresponding maximum value allowed by configuration; generates, in response to the determination, first session policy control information for a first session in the network slice; and sends the first session policy control
(Continued)

information to a session management network element corresponding to the first session, the first session policy control information being for policy control on the first session.

17 Claims, 12 Drawing Sheets

(51) Int. Cl.
　　*H04L 41/0896*　　(2022.01)
　　*H04W 4/50*　　(2018.01)
　　*H04W 48/16*　　(2009.01)
　　*H04W 76/10*　　(2018.01)
　　*H04L 41/0895*　　(2022.01)

(52) U.S. Cl.
　　CPC ............ *H04W 4/50* (2018.02); *H04W 48/16* (2013.01); *H04W 76/10* (2018.02); *H04L 41/0895* (2022.05)

(58) Field of Classification Search
CPC . H04W 92/18; H04W 72/0453; H04W 76/19; H04W 72/56; H04W 84/042; H04W 88/085; H04W 64/00; H04W 36/08; H04W 60/04; H04W 72/02; H04W 12/08; H04W 72/27; H04W 36/362; H04W 72/542; H04W 72/53; H04W 48/02; H04W 48/08; H04W 52/0212; H04W 72/12; H04W 72/541; H04W 28/06; H04W 72/04; H04W 88/08; H04W 88/12; H04W 36/00837; H04L 41/00; H04L 41/0896; H04L 41/0895; H04L 41/5009; H04L 41/5019; H04L 41/0894; H04L 67/14; H04L 43/16; H04L 1/1812; H04L 1/1896; H04L 12/2801; H04L 12/2869; H04L 12/2898; H04L 43/065; H04L 5/006; H04L 1/1854; H04L 41/40; H04L 12/1407; H04L 2209/80; H04L 25/0254; H04L 41/0613; H04M 7/006; H04M 15/66; G01S 5/021; G01S 1/026; G01S 5/011; G01S 3/02; G01S 5/0215; G01S 5/0221; G01S 5/0236; G06N 20/00; G06N 3/045; G06N 3/0455; G06N 3/0464; G06N 3/08; G06N 3/082; G06N 3/088; G06N 3/092

See application file for complete search history.

(56) References Cited

U.S. PATENT DOCUMENTS

| | | | |
|---|---|---|---|
| 2019/0253917 A1* | 8/2019 | Dao | .................. H04W 28/0268 |
| 2019/0327660 A1 | 10/2019 | Hong et al. | |
| 2019/0357118 A1 | 11/2019 | Kim et al. | |
| 2020/0275358 A1* | 8/2020 | Bordeleau | ........... H04L 41/5054 |
| 2021/0153157 A1* | 5/2021 | Jeong | ...................... H04W 8/02 |

FOREIGN PATENT DOCUMENTS

| | | |
|---|---|---|
| CN | 109150565 A | 1/2019 |
| CN | 110035424 A | 7/2019 |
| CN | 110391926 A | 10/2019 |
| CN | 110519775 A | 11/2019 |
| IN | 108347336 A | 7/2018 |
| WO | 2019032968 A1 | 2/2019 |

OTHER PUBLICATIONS

3GPP TS 23.288 V16.2.0 (Dec. 2019), 3rd Generation Partnership Project; Technical Specification Group Services and System Aspects; Architecture enhancements for 5G System (5GS) to support network data analytics services(Release 16), 57 pages.

3GPP TS 23.316 V16.2.0 (Dec. 2019), 3rd Generation Partnership Project; Technical Specification Group Services and System Aspects; Wireless and wireline convergence access support for the 5G System (5GS)(Release 16), 80 pages.

3GPP TS 23.501 V16.3.0 (Dec. 2019), 3rd Generation Partnership Project; Technical Specification Group Services and System Aspects; System architecture for the 5G System (5GS); Stage 2(Release 16), 417 pages.

3GPP TS 23.503 V16.3.0 (Dec. 2019), 3rd Generation Partnership Project; Technical Specification Group Services and System Aspects; Policy and charging control framework for the 5G System (5GS); Stage 2(Release 16), 112 pages.

3GPP TS 29.512 V16.3.0 (Dec. 2019)3rd Generation Partnership Project;Technical Specification Group Core Network and Terminals;5G System; Session Management Policy Control Service;Stage 3(Release 16), total 178 pages.

5G; 5G System; Session Management Policy Control Service; Stage 3 (3GPP TS 29.512 version 15.1.0 Release 15), ETSI TS 129 512 v15.1.0 (Oct. 2018), total 117 pages.

\* cited by examiner

SLICE CONTROL METHOD AND APPARATUS

CROSS-REFERENCE OF RELATED APPLICATIONS

This is a continuation of International Application No. PCT/CN2020/104980, filed on Jul. 27, 2020, which claims priority to Chinese Patent Application No. 201911404788.1, filed on Dec. 30, 2019. The disclosures of the aforementioned applications are hereby incorporated by reference in their entireties.

TECHNICAL FIELD

This application relates to the field of computer technologies, and in particular, to a slice control method and an apparatus.

BACKGROUND

A network slice (NS) is a logical network that has a specific network feature and that is created from a communications network of an operator. Slicing is a key technology for meeting a network differentiation requirement of a 5th generation (5G) mobile communications system proposed by the 3rd Generation Partnership Project (3GPP).

When creating and deploying a network slice, the operator defines a service level specification (SLS). The SLS includes some specification parameters of the network slice, for example, a maximum quantity of terminals supported by the network slice and a maximum quantity of session connections supported by the network slice. If the network slice runs, a policy control network element may perform policy control on the network slice based on these specification parameters of the network slice. For example, in a registration management procedure, the quantity of terminals registered with the network slice is controlled not to exceed the maximum quantity of terminals supported by the network slice. In a session management procedure, the quantity of session connections established in the network slice is controlled not to exceed the maximum quantity of connections supported by the network slice.

In the conventional technology, whether to restrict a terminal from being registered with and a session from being established to a network slice is usually determined based on whether a quantity of registered terminals and a quantity of sessions in the entire network slice exceed limits. However, in some cases, there may be a large quantity of idle resources in some areas of the network slice. If a terminal is restricted from being registered with and a session is restricted from being established to the network slice in the area because the quantity of registered terminals and the quantity of sessions in the entire network slice exceed limits, a resource waste is caused. Even when a service running in the network slice is charged based on a quantity of session connections or connection duration, the operator may suffer economic losses. Therefore, a network may decide to allow access from some more users or sessions. However, there is no solution to how the network performs policy and charging rule control in this scenario.

SUMMARY

Embodiments of this application provide a slice control method and an apparatus, to perform session policy control based on an actual access status of a network slice.

According to a first aspect, embodiments of this application provide a slice control method. The method may be performed by a session management network element, for example, an SMF. The method includes: The session management network element sends a first request message to a policy control network element, where the first request message includes an identifier of a network slice and an overflow indication, the overflow indication indicates that a terminal device or a first session accesses the network slice in an overflow state, and the first request message is used to request first session policy control information associated with the first session. The session management network element receives a first response message from the policy control network element, where the first response message includes the first session policy control information. The session management network element performs policy control on the first session based on the first session policy control information.

According to the foregoing technical solution, the session management network element may use the first request message to be sent to the policy control network element to carry the overflow indication that indicates that the terminal device or the first session accesses the network slice in the overflow state. Therefore, the policy control network element can formulate corresponding session policy control information for the first session in the overflow state, to support the terminal device in establishing a session in the overflow state of the network slice, and fully utilize network resources.

With reference to the first aspect, in an embodiment of the first aspect, the session management network element may receive current slice access status information of the network slice from a slice access control network element, and determine, based on the slice access status information, that the network slice is currently in an overflow state.

According to the foregoing technical solution, the session management network element may autonomously determine whether the network slice is in the overflow state, to obtain the overflow indication. For example, after receiving a session establishment request message from an access management network element, the session management network element may determine whether a network slice of a session that the terminal device currently requests to establish is in an overflow state. If the network slice is in the overflow state in this case, it may indicate that the terminal device or the first session accesses the network slice in the overflow state.

With reference to the first aspect, in an embodiment of the first aspect, the session management network element may receive a session establishment request message from the access management network element, where the session establishment request message includes the identifier of the network slice and the overflow indication.

According to the foregoing technical solution, the overflow indication included in the first request message may be received by the session management network element from the access management network element. In other words, the access management network element may determine whether the network slice is in the overflow state, and send a corresponding overflow indication to the session management network element. For example, after receiving the session establishment request message from the terminal device, the access management network element may determine whether the network slice of the session that the terminal device currently requests to establish is in the overflow state. If the network slice is in the overflow state in this case, it may indicate that the terminal device or the first session accesses the network slice in the overflow state.

Therefore, the access management network element may send the corresponding overflow indication to the session management network element by using the forwarded session establishment request message.

With reference to the first aspect, in an embodiment of the first aspect, the first response message may further include a first subscription request, and the first subscription request is used to subscribe to an event that the terminal device, the first session, or the network slice cancels the overflow state.

According to the foregoing technical solution, the policy control network element may subscribe to the event that the terminal device, the first session, or the network slice cancels the overflow state from the session management network element, so that the policy control network element can update session policy control information of the first session in a timely manner when the terminal device, the first session, or the network slice cancels the overflow state.

With reference to the first aspect, in an embodiment of the first aspect, the session management network element may further send a second request message to the policy control network element, where the second request message includes a report of the event that the terminal device, the first session, or the network slice cancels the overflow state, and the second request message is used to request second session policy control information associated with the first session. Then, the session management network element may receive a second response message from the policy control network element, where the second response message includes the second session policy control information. The session management network element may perform policy control on the first session based on the received second session policy control information.

According to the foregoing technical solution, when the terminal device, the first session, or the network slice cancels the overflow state, the session management network element may request the policy control network element to update the session policy control information of the first session, so that the session policy control information is in time.

With reference to the first aspect, in an embodiment of the first aspect, the session management network element may receive updated slice access status information of the network slice and/or the report of the overflow state cancellation event from the slice access control network element, and determine, based on the updated slice access status information of the network slice and/or the report of the overflow state cancellation event, that the terminal device, the first session, or the network slice cancels the overflow state.

With reference to the first aspect, in an embodiment of the first aspect, the session management network element may send the first subscription request to the access management network element, and receive the report of the overflow state cancellation event from the access management network element.

According to the foregoing technical solution, the session management network element may learn, from the slice access control network element, that the terminal device, the first session, or the network slice cancels the overflow state, or may learn, from the access management network element, that the terminal device, the first session, or the network slice cancels the overflow state, to effectively improve flexibility of the slice control method.

With reference to the first aspect, in an embodiment of the first aspect, the slice access status information of the network slice includes one or more pieces of information in the following: a quantity of terminal devices accessing the network slice, a quantity of sessions established in the network slice, a traffic bandwidth of the network slice, and a terminal density in the network slice.

According to a second aspect, embodiments of this application provide another slice control method. The method may be performed by a policy control network element, for example, a PCF. The method includes: The policy control network element receives a first request message from a session management network element, where the first request message includes an identifier of a network slice and an overflow indication, and the overflow indication indicates that a terminal device or a first session accesses the network slice in an overflow state. The policy control network element generates, based on the overflow indication, first session policy control information associated with the first session. The policy control network element sends a first response message to the session management network element, where the first response message includes the first session policy control information.

According to the foregoing technical solution, the first request message received by the policy control network element from the session management network element may include the overflow indication that indicates that the terminal device or the first session accesses the network slice in the overflow state. Therefore, the policy control network element can formulate corresponding session policy control information for the first session in the overflow state, to support the terminal device in establishing a session in the overflow state of the network slice, and fully utilize network resources.

With reference to the second aspect, in an embodiment of the second aspect, the first response message may further include a first subscription request, and the first subscription request is used to subscribe to an event that the terminal device, the first session, or the network slice cancels the overflow state; or the policy control network element may further send the first subscription request to a slice access control network element.

According to the foregoing technical solution, the policy control network element may subscribe to the event that the terminal device, the first session, or the network slice cancels the overflow state from the session management network element, or may subscribe to the event that the terminal device, the first session, or the network slice cancels the overflow state from the slice access control network element. The policy control network element subscribes to the event that the terminal device, the first session, or the network slice cancels the overflow state, so that the policy control network element can learn of a change in an access status of the terminal device, the first session, or the network slice in a timely manner, and therefore, can update session policy control information for the first session in a timely manner when the overflow state is canceled.

With reference to the second aspect, in an embodiment of the second aspect, the policy control network element may receive a report of the event that the terminal device, the first session, or the network slice cancels the overflow state from the session management network element or the slice access control network element. Then, the policy control network element may generate second session policy control information associated with the first session, and send the second session policy control information to the session management network element.

According to the foregoing technical solution, after receiving the report of the event that the terminal device, the first session, or the network slice cancels the overflow state from the session management network element or the slice access control network element, the policy control network element may learn that the terminal device, the first session, or the network slice cancels the overflow state, and may update the session policy control information for the first session, so that the session management network element can perform policy control on the first session based on the updated session policy control information. In this way, a network can support a dynamic policy and charging rule, to avoid a charging error caused when the session policy control information is not updated or is not updated in a timely manner, and avoid impact on user experience.

According to a third aspect, embodiments of this application provide another slice control method. The method may be performed by an access management network element, for example, an AMF. The method includes: The access management network element receives a first session establishment request message from a terminal device, where the first session establishment request message includes an identifier of a network slice, and the first session establishment request message is used to request to establish a first session of the terminal device. The access management network element determines that the network slice is currently in an overflow state. The access management network element sends a second session establishment request message to a session management network element, where the second session establishment request message includes the identifier of the network slice and an overflow indication, the second session establishment request message is used to request to establish the first session of the terminal device, and the overflow indication indicates that the terminal device or the first session accesses the network slice in an overflow state.

According to the foregoing technical solution, after receiving the session establishment request message from the terminal device, the access management network element may determine whether a network slice in which the terminal device currently requests to establish a session is in the overflow state, and when the network slice is in the overflow state, use the session establishment request message to be forwarded to the session management network element to carry the overflow indication that indicates that the terminal device or the first session accesses the network slice in the overflow state, so that the policy control network element can formulate corresponding session policy control information for the first session in the overflow state, to support the terminal device in establishing a session in the overflow state of the network slice, and fully utilize network resources.

With reference to the third aspect, in an embodiment of the third aspect, that the access management network element determines that the network slice is currently in an overflow state may be: The access management network element receives current slice access status information of the network slice from a slice access control network element, and determines, based on the slice access status information, that the network slice is currently in the overflow state; or the access management network element determines, based on a stored overflow state flag corresponding to the network slice, that the network slice is currently in the overflow state.

According to the foregoing technical solution, there may be a plurality of embodiments in which the access management network element determines that the network slice is in the overflow state. In this way, flexibility of the slice control method can be effectively improved.

With reference to the third aspect, in an embodiment of the third aspect, the access management network element may receive a first subscription request from the session management network element, where the first subscription request is used to subscribe to an event that the terminal device, the first session, or the network slice cancels the overflow state. Correspondingly, the access management network element may send a report of the overflow state cancellation report to the session management network element after determining that the terminal device, the first session, or the network slice cancels the overflow state.

According to the foregoing technical solution, the access management network element may report the report of the event that the terminal device, the first session, or the network slice cancels the overflow state in a timely manner based on the first subscription request received from the session management network element, so that the policy control network element can update the session policy control information of the first session in a timely manner when the terminal device, the first session, or the network slice cancels the overflow state.

With reference to the third aspect, in an embodiment of the third aspect, that the access management network element determines that the terminal device, the first session, or the network slice cancels the overflow state may be: The access management network element receives updated slice access status information of the network slice from the slice access control network element, and determines, based on the updated slice access status information of the network slice, that the terminal device, the first session, or the network slice cancels the overflow state; or the access management network element receives the report of the overflow state cancellation event from the slice access control network element, and determines, based on the report of the overflow state cancellation event, that the terminal device, the first session, or the network slice cancels the overflow state; or the access management network element determines, based on a quantity of terminal devices accessing the network slice in a current area, that the terminal device, the first session, or the network slice cancels the overflow state According to the foregoing technical solution, there may be a plurality of embodiments in which the access management network element determines that the terminal device, the first session, or the network slice cancels the overflow state. In this way, flexibility of the slice control method can be effectively improved.

With reference to the third aspect, in an embodiment of the third aspect, the method further includes: The access management network element receives a registration request message from the terminal device, where the registration request message includes an identifier of a network slice that the terminal device requests to access. The access management network element determines, based on the current slice access status information of the network slice that is received from the slice access control network element, that the network slice is currently in the overflow state. The access management network element decides, based on the current slice access status information of the network slice, a network load status of the current area, and slice customer subscription, to allow the terminal device to access the network slice. The access management network element sends a registration accept message to the terminal device.

According to the foregoing technical solution, in a registration and access process of the terminal device, the access management network element may also determine whether the network slice that the terminal device requests to access is in the overflow state, and decide whether to allow the terminal device to access the network slice. In this way, the terminal device can be supported in accessing the network slice in the overflow state, to fully utilize network resources.

With reference to the third aspect, in an embodiment of the third aspect, after determining that the network slice is currently in the overflow state, the access management network element may store the overflow state flag corresponding to the network slice; and/or the access management network element may further send a second subscription request to the slice access control network element, where the second subscription request indicates the slice access control network element to send latest slice access status information of the network slice to the access management network element when an access status of the network slice changes.

With reference to the third aspect, in an embodiment of the third aspect, the slice access status information of the network slice includes one or more pieces of information in the following: a quantity of terminal devices accessing the network slice, a quantity of sessions established in the network slice, a traffic bandwidth of the network slice, and a terminal density in the network slice.

According to a fourth aspect, embodiments of this application provide another slice control method. The method may be performed by a policy control network element, for example, a PCF. The method includes: The policy control network element receives a first request message from a session management network element, where the first request message includes an identifier of a network slice, the first request message is used to request first session policy control information associated with a first session established in the network slice, and the first session is a session that a terminal device requests to establish. The policy control network element obtains current slice access status information of the network slice from a slice access control network element, and determines, based on the current slice access status information of the network slice, that the network slice is currently in an overflow state. The policy control network element generates the first session policy control information for the first session. The policy control network element sends a policy response message to the session management network element, where the policy response message includes the first session policy control information.

According to the foregoing technical solution, after receiving, from the session management network element, the first request message used to request to generate session policy control information for the first session, the policy control network element may obtain the current slice access status information of the network slice from the slice access control network element, to learn that the terminal device or the first session accesses the network slice in the overflow state. In this way, the policy control network element can formulate corresponding session policy control information for the first session established in the overflow state, to support the terminal device in establishing a session in the overflow state of the network slice, and fully utilize network resources.

With reference to the fourth aspect, in an embodiment of the fourth aspect, the policy control network element may further send a second subscription request to the slice access control network element, where the second subscription request indicates the slice access control network element to send latest slice access status information to the policy control network element when an access status of the network slice changes.

According to the foregoing technical solution, the policy control network element subscribes to the slice access status information of the network slice from the slice access control network element, so that the policy control network element can learn of a change of an access status of the terminal device, the first session, or the network slice in a timely manner based on a change of the access status information of the network slice, and therefore, can update session policy control information for the first session in a timely manner when the terminal device, the first session, or the network slice cancels the overflow state.

With reference to the fourth aspect, in an embodiment of the fourth aspect, the method further includes: The policy control network element determines, based on updated slice access status information of the network slice and/or a report of the overflow state cancellation event that are/is received from the slice access control network element, that the terminal device, the first session, or the network slice cancels the overflow state. The policy control network element updates session policy control information for the first session. The policy control network element sends updated second session policy control information to the session management network element.

According to the foregoing technical solution, when learning that the terminal device, the first session, or the network slice cancels the overflow state, the policy control network element may update the session policy control information of the first session in a timely manner, so that the session management network element can perform policy control on the first session based on the updated session policy control information. In this way, a network can support a dynamic policy and charging rule, to avoid a charging error caused when the session policy control information is not updated or is not updated in a timely manner, and avoid impact on user experience.

With reference to the fourth aspect, in an embodiment of the fourth aspect, the slice access status information of the network slice includes one or more pieces of information in the following: a quantity of terminal devices accessing the network slice, a quantity of sessions established in the network slice, a traffic bandwidth of the network slice, and a terminal density in the network slice.

According to a fifth aspect, embodiments of this application provide another slice control method. The method may be performed by a policy control network element, for example, a PCF. The method includes: The policy control network element receives an overflow indication related to a first session or slice access status information, where the overflow indication indicates that a terminal device or the first session accesses a network slice in an overflow state, and the slice access status information includes one or more pieces of information of a quantity of terminal devices accessing the network slice, a quantity of sessions established in the network slice, a traffic bandwidth of the network slice, and a terminal density in the network slice. The policy control network element generates, based on the overflow indication or the slice access status information, first session policy control information associated with the first session. The policy control network element sends a first message to a session management network element corresponding to the first session, where the first message includes the first session policy control information.

According to the foregoing technical solution, the policy control network element may determine, based on the received overflow indication related to the first session or the received slice access status information, that session policy control information needs to be generated for the first session in the overflow state in the network slice, and then send the generated session policy control information to the session management network element corresponding to the first session. The session management network element performs policy control on the first session. In this way, the terminal device can be supported in establishing a session in the overflow state of the network slice, to fully utilize network resources.

With reference to the fifth aspect, in an embodiment of the fifth aspect, the first message further includes a first subscription request, and the first subscription request is used to subscribe to an event that the terminal device, the first session, or the network slice cancels the overflow state; or the policy control network element may further send the first subscription request to a slice access control network element.

According to the foregoing technical solution, the policy control network element may subscribe to the event that the terminal device, the first session, or the network slice cancels the overflow state from the session management network element, or may subscribe to the event that the terminal device, the first session, or the network slice cancels the overflow state from the slice access control network element. The policy control network element subscribes to the event that the terminal device, the first session, or the network slice cancels the overflow state, so that the policy control network element can learn of a change in an access status of the terminal device, the first session, or the network slice in a timely manner, and therefore, update session policy control information for the first session in a timely manner when the overflow state is canceled.

With reference to the fifth aspect, in an embodiment of the fifth aspect, the first message is a first response message. That the policy control network element receives an overflow indication related to a first session may be: The policy control network element receives a first request message from the session management network element, where the first request message includes an identifier of the network slice and the overflow indication.

According to the foregoing technical solution, the policy control network element may receive the overflow indication by using the first request message sent by the session management network element, to learn that the terminal device or the first session accesses the network slice in the overflow state.

With reference to the fifth aspect, in an embodiment of the fifth aspect, the first message is a first notification message. That the policy control network element receives an overflow indication related to a first session may be: The policy control network element receives the slice access status information of the network slice from the slice access control network element.

According to the foregoing technical solution, the policy control network element may also receive the slice access status information of the network slice from the slice access control network element, to learn that the terminal device or the first session accesses the network slice in the overflow state.

With reference to the fifth aspect, in an embodiment of the fifth aspect, the method further includes: The policy control network element receives a report of the event that the terminal device, the first session, or the network slice cancels the overflow state from the session management network element or the slice access control network element. The policy control network element generates second session policy control information associated with the first session, and sends the second session policy control information to the session management network element.

According to the foregoing technical solution, when learning that the terminal device, the first session, or the network slice cancels the overflow state, the policy control network element may update the session policy control information of the first session in a timely manner, so that the session management network element can perform policy control on the first session based on the updated session policy control information. In this way, a network can support a dynamic policy and charging rule, to avoid a charging error caused when the session policy control information is not updated or is not updated in a timely manner, and avoid impact on user experience.

According to a sixth aspect, embodiments of this application provide a communications apparatus. The apparatus has a function of implementing the session management network element in any one of the first aspect or the embodiments of the first aspect, or may have a function of implementing the policy control network element in any one of the second aspect or the embodiments of the second aspect, or may have a function of implementing the access management network element in any one of the third aspect or the embodiments of the third aspect, or may have a function of implementing the policy control network element in any one of the fourth aspect or the embodiments of the fourth aspect, or may have a function of implementing the policy control network element in any one of the fifth aspect or the embodiments of the fifth aspect. The apparatus may be a network device, or may be an apparatus included in a network device, for example, a chip, or may be an apparatus including a network device. The functions of the communications apparatus may be implemented by hardware, or may be implemented by hardware by executing corresponding software. The hardware or the software includes one or more modules corresponding to the functions.

In an embodiment, a structure of the apparatus includes a processing module and a transceiver module. The processing module is configured to support the apparatus in performing a corresponding function of the session management network element in any one of the first aspect or the designs of the first aspect, or a corresponding function of the policy control network element in any one of the second aspect or the designs of the second aspect, or a corresponding function of the access management network element in any one of the third aspect or the designs of the third aspect, or a corresponding function of the policy control network element in any one of the fourth aspect or the designs of the fourth aspect, or a corresponding function of the policy control network element in any one of the fifth aspect or the designs of the fifth aspect. The transceiver module is configured to support communication between the apparatus and another communications device. For example, when the apparatus is the session management network element, the apparatus may send a first request message to the policy control network element. The communications apparatus may further include a storage module. The storage module is coupled to the processing module, and stores program instructions and data that are necessary for the apparatus. In an example, the processing module may be a processor, a communications module may be a transceiver, and the storage module may be a memory. The memory may be integrated with the processor, or may be disposed separately from the processor. This is not limited in this application.

In another embodiment, a structure of the apparatus includes a processor, and may further include a memory. The processor is coupled to the memory, and may be configured to execute computer program instructions stored in the memory, so that the apparatus performs the method in any one of the first aspect or the embodiments of the first aspect, or the method in any one of the second aspect or the designs of the second aspect, or the method in any one of the third aspect or the designs of the third aspect, or the method in any one of the fourth aspect or the designs of the fourth aspect, or the method in any one of the fifth aspect or the designs of the fifth aspect. Optionally, the apparatus further includes a communications interface, and the processor is coupled to the communications interface. When the apparatus is the network device, the communications interface may be a transceiver or an input/output interface. When the apparatus is the chip included in the network device, the communications interface may be an input/output interface of the chip. Optionally, the transceiver may be a transceiver circuit, and the input/output interface may be an input/output circuit.

According to a seventh aspect, embodiments of this application provide a chip system, including: a processor. The processor is coupled to a memory, the memory is configured to store a program or instructions. When the program or the instructions are executed by the processor, the chip system is enabled to implement the method in any one of the first aspect or the embodiments of the first aspect, or the method in any one of the second aspect or the embodiments of the second aspect, or the method in any one of the third aspect or the embodiments of the third aspect, or the method in any one of the fourth aspect or the embodiments of the fourth aspect, or the method in any one of the fifth aspect or the embodiments of the fifth aspect.

Optionally, the chip system further includes an interface circuit, and the interface circuit is configured to exchange code instructions with the processor.

Optionally, there may be one or more processors in the chip system, and the processor may be implemented by hardware or may be implemented by software. When the processor is implemented by the hardware, the processor may be a logic circuit, an integrated circuit, or the like. When the processor is implemented by the software, the processor may be a general-purpose processor, and is implemented by reading software code stored in the memory.

Optionally, there may be one or more memories in the chip system. The memory may be integrated with the processor, or may be disposed separately from the processor. This is not limited in this application. For example, the memory may be a non-transitory processor such as a read-only memory ROM. The memory and the processor may be integrated into a same chip, or may be separately disposed on different chips. A type of the memory and a manner of disposing the memory and the processor are not specifically limited in this application.

According to an eighth aspect, embodiments of this application provide a computer-readable storage medium. The computer-readable storage medium stores a computer program or instructions. When the computer program or the instructions are executed, a computer is enabled to perform the method in any one of the first aspect or the embodiments of the first aspect, or the method in any one of the second aspect or the embodiments of the second aspect, or the method in any one of the third aspect or the embodiments of the third aspect, or the method in any one of the fourth aspect or the embodiments of the fourth aspect, or the method in any one of the fifth aspect or the embodiments of the fifth aspect.

According to a ninth aspect, embodiments of this application provide a computer program product. When a computer reads and executes the computer program product, the computer is enabled to perform the method in any one of the first aspect or the embodiments of the first aspect, or the method in any one of the second aspect or the embodiments of the second aspect, or the method in any one of the third aspect or the embodiments of the third aspect, or the method in any one of the fourth aspect or the embodiments of the fourth aspect, or the method in any one of the fifth aspect or the embodiments of the fifth aspect.

According to a tenth aspect, embodiments of this application provide a communications system. The communications system includes a session management network element, a policy control network element, and an access management network element. Optionally, the communications system may further include a terminal device.

DESCRIPTION OF EMBODIMENTS

To make objectives, technical solutions, and advantages of embodiments of this application clearer, the following further describes embodiments of this application in detail with reference to the accompanying drawings.

The technical solutions of embodiments of this application may be used in various communications systems, such as a global system for mobile communications (GSM), a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD) system, a universal mobile telecommunication system (UMTS), a worldwide interoperability for microwave access (WIMAX) communications system, and a 5th generation (5G) system or a new radio (NR) system, or is used in a future communications system or another similar communications system.

Figure 1:
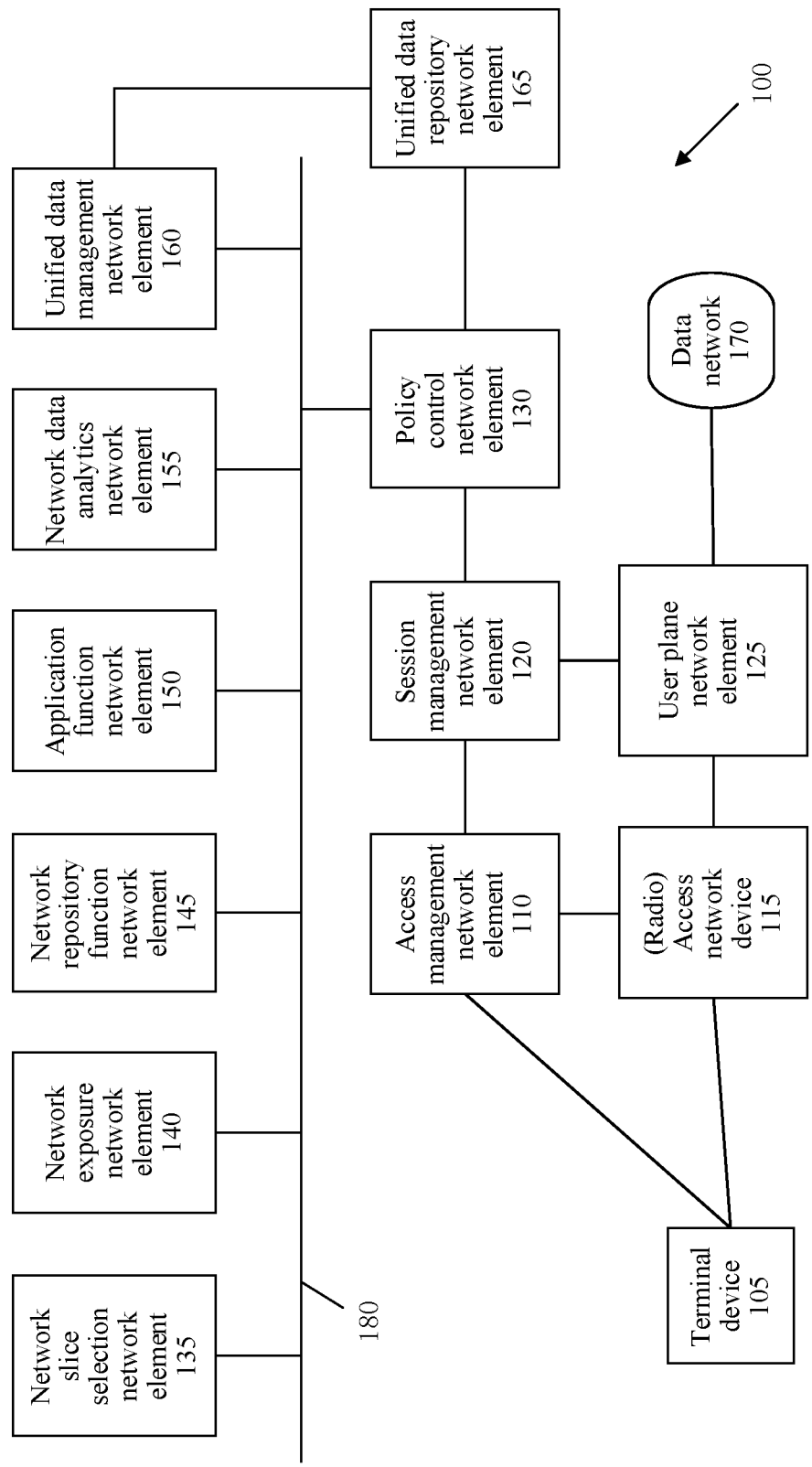
FIG. 1 is a diagram of a communications system to which an embodiment of this application is applicable.

FIG. 1 is a diagram of a communications system 100 to which an embodiment of this application is applicable. The communications system 100 includes a terminal device 105, an access network device 110, an access management network element 115, a session management network element 120, a user plane network element 125, a policy control network element 130, a network slice selection network element 135, a network repository function network element 145, a network data analytics network element 155, a unified data management network element 160, a unified data repository network element 165, an application function network element 150, a network exposure network element 140, and a data network (DN) 170 connected to an operator network. The terminal device may send service data to the data network 170 and receive service data from the data network 170 through the access network device 110 and the user plane network element 125. The plurality of network elements may be connected to a service bus 180, and communicate with each other through the service bus 180. The service bus may also be understood as a message bus. A network element may send a message to a target network element on the service bus 180, to invoke a service provided by another network element.

The terminal device 105 is a device having a wireless transceiver function, and may be deployed on land, including an indoor device, an outdoor device, a handheld device, a wearable device, or a vehicle-mounted device; may be deployed on water (for example, on a ship); or may be deployed in the air (for example, on a plane, a balloon, and a satellite). The terminal device 105 may communicate with a core network through a radio access network (RAN), and exchange voice and/or data with the RAN. The terminal device 105 may be a mobile phone, a tablet computer (Pad), a computer with a wireless transceiver function, a mobile Internet device (MID), a wearable device, a virtual reality (VR) terminal device, an augmented reality (AR) terminal device, a wireless terminal in industrial control, a wireless terminal in self driving, a wireless terminal in remote medical, a wireless terminal in a smart grid, a wireless terminal in transportation safety, a wireless terminal in a smart city, a wireless terminal in a smart home, or the like. An application scenario is not limited in embodiments of this application. The terminal device 105 may also be sometimes referred to as user equipment (UE), a mobile station, a remote station, and the like. A specific technology, a device form, and a name that are used by the terminal device 105 are not limited in embodiments of this application.

The access network device 110 is a device that is in a network and that is configured to connect the terminal device to a wireless network. The access network device 110 may be a node in the radio access network, and may also be referred to as a base station, or may also be referred to as a radio access network (RAN) node (or device). A network device may be an evolved NodeB (eNB, e-NodeB, or evolutional NodeB) in a Long Term Evolution (LTE) system or an LTE-Advanced (LTE-A) system, such as a conventional macro base station eNB and a micro base station eNB in a heterogeneous network scenario, or may be a next generation NodeB (gNB) in a 5G NR system, or may be a radio network controller (RNC), a NodeB (NB), a base station controller (BSC), a base transceiver station (BTS), a transmission reception point (TRP), a home base station (for example, a home evolved NodeB or a home NodeB, HNB), a baseband unit (BBU), a baseband unit pool BBU pool, a Wi-Fi access point (AP), or the like, or may be a centralized unit (CU) and a distributed unit (DU) in a cloud radio access network (CloudRAN) system. This is not limited in embodiments of this application. In a scenario in which a CU and a DU included by the access network device are separate, the CU supports protocols such as radio resource control (RRC), a packet data convergence protocol (PDCP), and a service data adaptation protocol (SDAP). The DU mainly supports a radio link control (RLC) layer protocol, a media access control (MAC) layer protocol, and a physical layer protocol.

The access management network element 115 is mainly used for attachment, mobility management, and a tracking area update process of a terminal in a mobile network. The access management network element 115 terminates a non-access stratum (NAS) message, completes registration management, connection management, reachability management, allocates a tracking area list (TA list), completes mobility management and the like, and transparently routes a session management (SM) message to the session management network element 120. In a 5G communications system, the access management network element 115 may be an access and mobility management function (AMF). In a future communications system (for example, a 6G communications system), the mobility management network element may still be the AMF network element, or may have another name. This is not limited in this application.

The session management network element 120 is mainly used for session management in a mobile network, for example, session establishment, modification, and release. A specific function is, for example, assigning an Internet Protocol (IP) address to the terminal, or selecting a user plane network element that provides a packet forwarding function. In the 5G communications system, the session management network element 120 may be a session management function (SMF). In the future communications system (for example, the 6G communications system), the session management network element 120 may still be the SMF network element, or may have another name. This is not limited in this application.

The user plane network element 125 is mainly used for processing a user packet, such as forwarding, charging, and lawful interception. The user plane network element 125 may also be referred to as a protocol data unit (PDU) session anchor (PSA). In the 5G communications system, the user plane network element 125 may be a user plane function (UPF). In the future communications system (for example, the 6G communications system), the user plane network element 125 may still be the UPF network element, or may have another name. This is not limited in this application.

The policy control network element 130 has a user subscription data management function, a policy control function, a charging policy control function, quality of service (QoS) control, and the like. In the 5G communications system, the policy control network element 130 may be a policy control function (PCF). In the future communications system (for example, the 6G communications system), the policy control network element 130 may still be the PCF network element, or may have another name. This is not limited in this application.

The network slice selection network element 135 is mainly used for selecting an appropriate network slice for a service of the terminal device. In the 5G communications system, the network slice selection network element 135 may be a network slice selection function (NSSF) network element. In the future communications system (for example, the 6G communications system), the network slice selection network element 135 may still be the NSSF network element, or may have another name. This is not limited in this application.

The network repository function network element 145 is mainly used for providing a registration and discovery function for a network element or a service provided by a network element. In the 5G communications system, the network repository function network element 145 may be a network repository function (NRF). In the future communications system (for example, the 6G communications system), the network repository function network element 145 may still be the NRF network element, or may have another name. This is not limited in this application.

The network data analytics network element 155 may collect data from each network function (NF), for example, the policy control network element, the session management network element, the user plane network element, the access management network element, and the application function network element (by using a network capability exposure function network element), and perform analysis and prediction. In the 5G communications system, the network data analytics network element 155 may be a network data analysis function (NWDAF). In the future communications system (for example, the 6G communications system), the network data analytics network element 155 may still be the NWDAF network element, or may have another name. This is not limited in this application.

The unified data management network element 160 is mainly used for managing subscription information of the terminal device. In the 5G communications system, the unified data management network element 160 may be unified data management (UDM). In the future communications system (for example, the 6G communications system), the unified data management network element 160 may still be the UDM network element, or may have another name. This is not limited in this application.

The unified data repository network element 165 is mainly used for storing structured data information, including subscription information, policy information, and network data or service data defined in a standard format. In the 5G communications system, the unified data repository network element 165 may be unified data repository (UDR). In the future communications system (for example, the 6G communications system), the unified data repository network element 165 may still be the UDR network element, or may have another name. This is not limited in this application.

The application function network element 150 may provide service data of various applications for a control plane network element in a communications network of an operator, or obtain data information and control information of a network from a control plane network element in the communications network. In the 5G communications system, the application function network element 150 may be an application function (AF). In the future communications system (for example, the 6G communications system), the application function network element 150 may still be the AF network element, or may have another name. This is not limited in this application.

The network exposure network element 140 may expose some functions of a network to an application in a controlled manner. In the 5G communications system, the network exposure network element 140 may be a network exposure function (NEF). In the future communications system (for example, the 6G communications system), the network exposure network element 140 may still be the NEF network element, or may have another name. This is not limited in this application.

The data network 170 is mainly used for providing a data transmission service for the terminal device. The data network 170 may be a private network, such as a local area network, or may be a public data network (PDN), such as the Internet, or may be a dedicated network jointly deployed by operators, such as a configured IP multimedia network subsystem (IMS) service.

It should be understood that the network elements or the functions may be network elements in a hardware device, software functions running on dedicated hardware, or virtualization functions instantiated on a platform (for example, a cloud platform).

It should be further understood that 5GC network functions such as the AMF, the NSSF, the NWDAF, the UDM, and the UDR may be shared by a plurality of network slices. The SMF, the UPF, and the PCF may belong to a specific network slice. Alternatively, the access network device (for example, a gNB) may be shared by a plurality of network slices. It may be defined that the gNB configures, for a network slice, a minimum occupation ratio of resources that need to be reserved and a maximum occupation ratio of resources that are allowed to be used.

For ease of description, an example in which an access management network element is an AMF network element, a session management network element is an SMF network element, and a policy control network element is a PCF network element is used as for subsequent descriptions in this application. Further, the AMF network element is briefly referred to as an AMF, the SMF network element is briefly referred to as an SMF, and the PCF network element is briefly referred to as a PCF. In the following of this application, all AMFs may be replaced with access management network elements, all SMFs may be replaced with session management network elements, and all PCFs may be replaced with policy control network elements.

The following describes in detail a network slice in embodiments of this application.

A network slice is a logical network that is customized based on different service requirements on a physical or virtual network infrastructure and that has a specific network feature. A 5G physical network can be abstractly divided into a plurality of network slices. Each network slice forms an end-to-end logical network. The plurality of network slices are logically isolated from each other and do not affect each other.

Currently, three types of network slices are defined in the 3rd Generation Partnership Project (3GPP) protocol: enhanced mobile broadband (eMBB), ultra-reliable and low latency communications (uRLLC), and a massive machine type connection (mMTC). In the context of in-depth research and large-scale commercial deployment of 5G communications networks, types of network slices will increase significantly in the foreseeable future.

Each type of network slice has a specific network feature. For example, an eMBB network slice requires a feature of supporting high-bandwidth and low-latency services. A mMTC network slice has a feature of supporting a massive access and low bandwidth. An uRLLC network slice has a feature of high reliability and low latency. Supported application service types, end-to-end latency, and a single-terminal maximum rate are feature attributes of a network slice and depend on a design of the network slice.

When creating a network slice, an operator signs a SLA with a customer (for example, an individual, an enterprise, or a neighboring internet service provider (ISP) that has a business transaction with the operator) based on a service requirement. A part about technical description in the SLA is referred to as a service level specification (SLS), and the SLS includes some technical specifications supported by a network slice, for example, a specification attribute of the network slice, and the feature attributes of the network slice described above.

The specification attribute of the network slice may include one or more of the following specification parameters:

1. a quantity of registered and accessed terminal devices, that is, a maximum quantity of terminals that can be registered with and access the network slice;
2. a quantity of established sessions, that is, a maximum quantity of sessions that are supported in a connected state at the same time;
3. a maximum traffic bandwidth of the slice, that is, a maximum service traffic supported between the network slice and a data network; and
4. a terminal density, that is, a maximum quantity of terminals allowed to register and access per unit area, a maximum quantity of sessions allowed to be in a connected state at the same time per unit area, or a maximum traffic bandwidth allowed per unit area.

If a network slice runs, the operator needs to ensure that a service and performance provided by the network slice can meet an SLS requirement, perform charging based on the specification attribute of the slice, and further restrict a user of the slice from using excess resources, to prevent a service of a user of another network slice from being affected.

Figure 2:
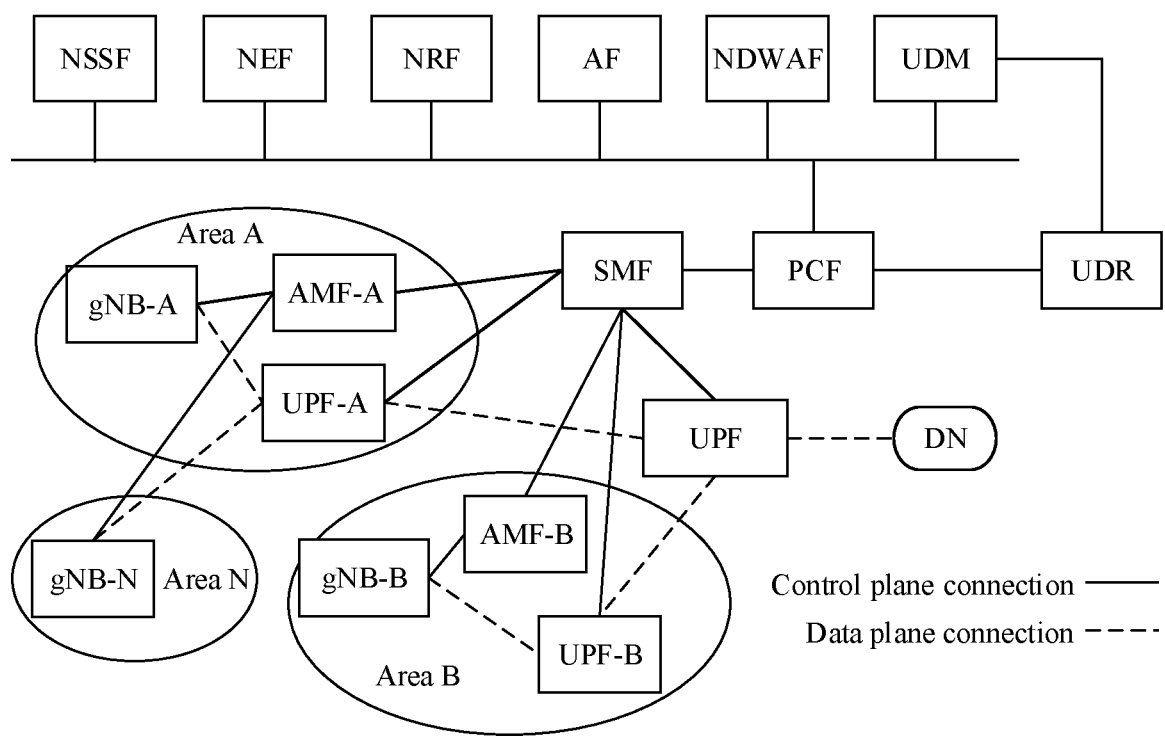
FIG. 2 is a diagram of a service area of a network slice according to an embodiment of this application.

Usually, a service area of a network slice may be divided into a plurality of areas. As shown in FIG. 2, a service area of an entire network slice is divided into an area A, an area B, and an area N. Each area has some regionally restricted network resources, indicating only terminals in a local area can use these network resources. In addition, these network resources are limited, and this becomes a resource bottleneck of a maximum network service capability of the area. The regionally restricted network resources may be gNBs, for example, a gNB-A and a gNB-N in FIG. 2, or may be UPFs, for example, a UPF-B in FIG. 2. The areas in embodiments of this application may be one or more cells, or may be one or more tracking areas (TA), or may be one or more service areas of an AMF, an SMF, or a UPF.

Before deploying a slice, the operator determines or plans, based on a customer requirement, one or more indicators of a maximum quantity of terminals that are allowed to access the slice, a maximum quantity of concurrent sessions, or a maximum traffic bandwidth of the network slice in each area. Values of these indicators are closely related to network resources that need to be reserved for deploying the network slice in each area. Alternatively, for simplification, the operator may plan, in an entire coverage area of a slice, only a maximum quantity of terminals that are allowed to access the slice, a quantity of concurrent sessions, or a maximum traffic bandwidth per unit area, that is, a registered terminal density, a concurrent session density, or a traffic density. One or more of the three densities may be collectively referred to as a terminal density or a user density. During slice deployment, each area determines, based on the terminal density and a size of the area, a maximum quantity of terminals accessing the network slice, a maximum quantity of concurrent sessions, or a maximum traffic bandwidth that is supported by the network slice in the area. It should be understood that, the network slice may plan a terminal density that needs to be supported by the entire network slice. In other words, terminal densities that need to be supported by all areas are the same. Alternatively, terminal densities that need to be supported may be separately planned for the areas. In other words, terminal densities that need to be supported by the areas may be different.

Further, for an area, the operator may determine a quantity of restricted network resources of the network slice in the area based on a terminal density that needs to be supported by the area. For example, when a gNB shared by a plurality of network slices is a regionally restricted network resource, most radio resources allowed to be used by a newly deployed slice or a maximum proportion of radio resources allowed to be used by the slice to all radio resources of the gNB is determined based on a registered terminal density and a session density that need to be supported by the slice. If a dedicated UPF in a newly established network slice is a regionally restricted network resource, a quantity of UPF resources that need to be deployed is determined based on a session density that needs to be supported by the newly deployed slice, an area size, and a guaranteed bandwidth of each terminal, or the quantity of UPF resources that need to be deployed is determined based on a total bandwidth of data service traffic of the network slice in the area.

Considering a tidal effect of service volume fluctuation caused by movement of a terminal, some redundancy resources deployed in a network slice in each area are reserved. In other words, a sum of a maximum quantity of terminals that are allowed to access a network slice, a maximum quantity of concurrent sessions, or a maximum traffic bandwidth in each area is usually greater than a quantity of terminals that are allowed to be registered with a network slice, a quantity of concurrent sessions, or a maximum traffic bandwidth in the entire network slice.

Therefore, the operator can decide, based on a network congestion status, slice subscription information, and operator configurations of the current area, whether to allow access of a user or a session beyond parameters defined in the SLA, and perform dynamic policy and charging control based on an actual access status. For example, a tenant of a slice signs a contract with the operator to support an upper access limit of 100,000 users. For extra users, the operator may perform policy and charging control by using differentiated QoS (such as bandwidth and a scheduling priority), a differentiated charging rate, and the like. When a quantity of users accessing the slice falls below the access upper limit, a network needs to adjust previously delivered policy and charging rules, and delivers corresponding policy and charging rules based on slice subscription information. For example, the network decides a policy based on QoS and a charging rate specified in the slice tenant subscription, and delivers corresponding policy and charging rules.

It should be noted that the terms "system" and "network" may be used interchangeably in embodiments of this application. "A plurality of" means two or more. In view of this, "a plurality of" may also be understood as "at least two" in embodiments of this application. "At least one" may be understood as one or more, for example, one, two, or more. For example, "including at least one" means including one, two, or more, and does not limit which items are included. For example, if at least one of A, B, and C is included, A, B, C, A and B, A and C, B and C, or A, B, and C may be included. Similarly, understanding of description such as "at least one type" is similar. "And/or" describes an association relationship between associated objects and indicates that three relationships may exist. For example, A and/or B may indicate the following three cases: Only A exists, both A and B exist, and only B exists. In addition, unless otherwise specified, the character "/" generally indicates an "or" relationship between the associated objects.

Unless otherwise stated, ordinal numbers such as "first" and "second" in embodiments of this application are used to distinguish between a plurality of objects, but are not intended to limit a sequence, a time sequence, priorities, or importance of the plurality of objects. In addition, description of "first" and "second" does not necessarily indicate that objects are different.

Embodiment 1

Figure 3:
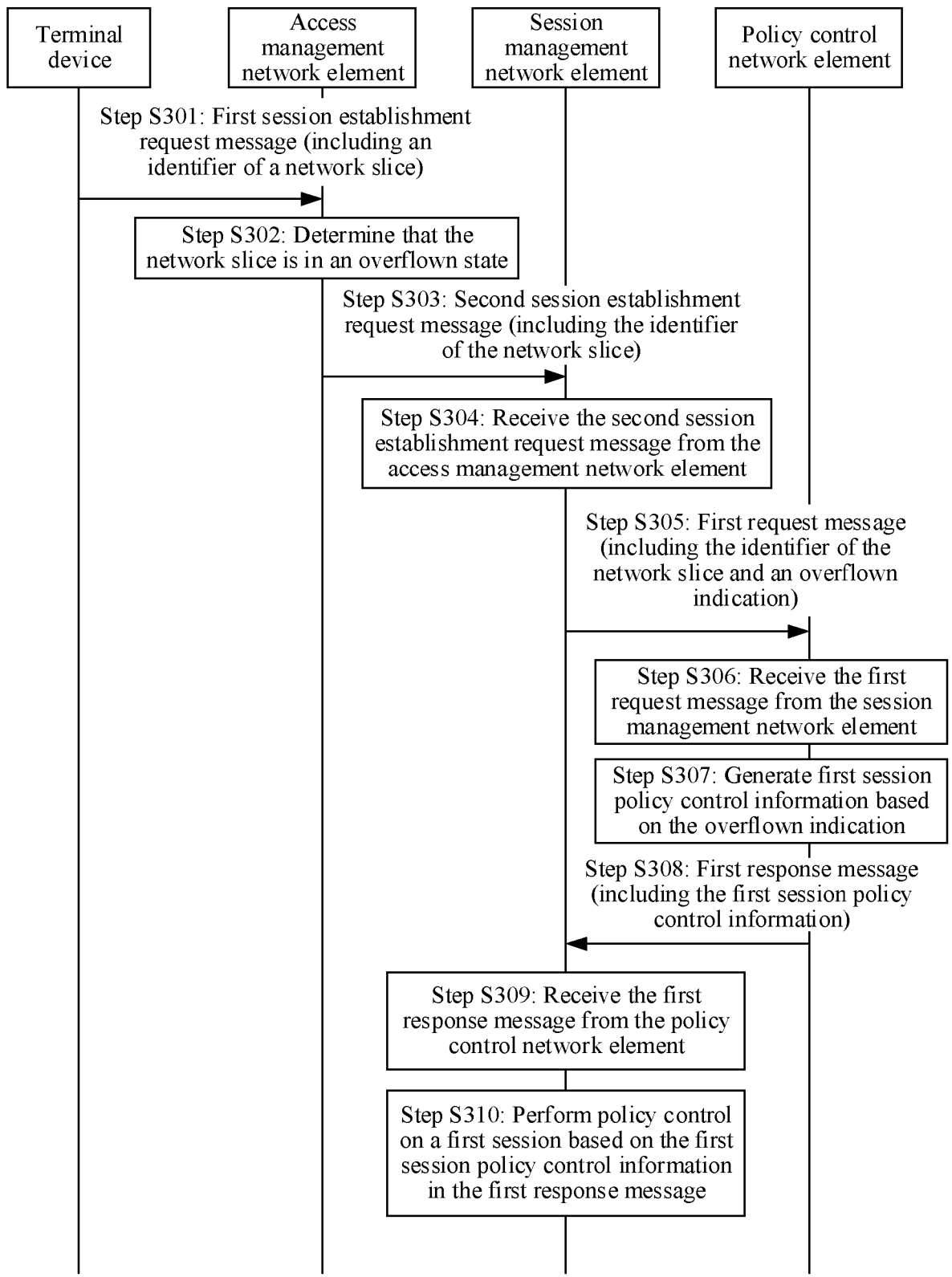
FIG. 3 is a flowchart of a slice control method according to an embodiment of this application.

FIG. 3 is a flowchart of a slice control method according to an embodiment of this application. The method includes the following steps.

Step S301: An access management network element receives a first session establishment request message from a terminal device. The first session establishment request message includes an identifier of a network slice.

In this embodiment of this application, the first session establishment request message is used to request to establish a first session of the terminal device, and the first session may be a PDU session. Optionally, the first session establishment request message may include an identifier of the first session (namely, a PDU session ID) and/or an identifier of the terminal device (namely, a UE ID), and the identifier of the terminal device may also be understood as a user identifier.

After receiving the first session establishment request message from the terminal device, the access management network element may determine, based on the identifier of the network slice in the first session establishment request message, a network slice in which the first session needs to be established. The network slice may also be referred to as a target network slice or a target slice. The identifier of the network slice may be single network slice selection assistance information (S-NSSAI), or may be other identification information used to identify the network slice. This is not limited in this application.

Step S302: The access management network element determines that the network slice is in an overflow state.

In this embodiment of this application, the network slice being in the overflow state means that one or more quantity reach or exceed a corresponding maximum value allowed by configuration. The one or more quantity includes the one or more quantity from a quantity of terminal devices accessing the network slice, a quantity of session connections established in the network slice, a traffic bandwidth of the network slice, and a terminal density. One or more of the quantity of terminal devices accessing the network slice, the quantity of sessions established in the network slice, the traffic bandwidth of the network slice, and the terminal density may be referred to as slice access status information of the network slice.

In an embodiment, after receiving the first session establishment request message, the access management network element may obtain current slice access status information of the network slice from a slice access control network element. If one or more parameters (for example, a quantity of access terminals or a quantity of sessions) in the current slice access status information of the network slice exceed a corresponding maximum value allowed by configuration, the access management network element may determine that the network slice is currently in the overflow state. The obtaining the current slice access status information of the network slice from the slice access control network element may also be understood as receiving or querying for the current slice access status information of the network slice from the slice access control network element.

In this embodiment of this application, the slice access control network element is configured to collect slice access status information of a network slice. The slice access control network element may be shared by a plurality of network slices, or may belong to a network slice. In actual deployment, the slice access control network element may be an independently deployed control function network element across network slices, or may be deployed together with an NSSF/NWDAF/UDM/UDR. This is not limited in this application.

In another embodiment, the access management network element may determine, based on a stored overflow state flag corresponding to the network slice, that the network slice is currently in the overflow state. The overflow state flag may be set by the access management network element when the access management network element previously determines that the network slice is in the overflow state. For example, the access management network element may determine, in a registration process of the terminal device, that the network slice is in the overflow state, and set the overflow state flag.

In this embodiment of this application, the access management network element may store the overflow state flag corresponding to the network slice when the network slice is in the overflow state, and delete or cancel the overflow state flag when the network slice cancels the overflow state (that is, the network slice is not in the overflow state). In this way, when receiving the first session establishment request message from the terminal device, the access management network element may determine, based on whether there is the overflow state flag, whether the network slice is in the overflow state.

To ensure accuracy of the overflow state flag, the access management network element may subscribe to the slice access status information of the network slice from the slice access control network element, to update, based on the slice access status information of the network slice, the overflow state flag corresponding to the network slice in a timely manner. The access management network element may send a second subscription request to the slice access control network element. The second subscription request indicates the slice access control network element to send latest slice access status information of the network slice to the access management network element when an access status of the network slice changes. For example, the slice access control network element may send the latest slice access status information of the network slice to the access management network element when one or more parameters in the slice access status information of the network slice exceed a corresponding maximum value allowed by configuration (which may be referred to as parameter overflow for short). Alternatively, the slice access control network element may send the latest slice access status information of the network slice to the access management network element when change amplitudes of one or more parameters in the slice access status information of the network slice exceed specified ranges. Alternatively, the slice access control network element may periodically send the latest slice access status information of the network slice to the access management network element at a specified time interval. Optionally, the access management network element may further store the slice access status information of the network slice received from the slice access control network element.

For example, the overflow state flag may be a flag bit in a memory of the access management network element. The access management network element may determine, based on the slice access status information of the network slice received from the slice access control network element, whether the network slice is in the overflow state, set the flag bit corresponding to the network slice in the memory to 1 when determining that the network slice is in the overflow state, and set the flag bit corresponding to the network slice in the memory to 0 when determining that the network slice cancels the overflow state. Then, the access management network element may further adjust, based on the updated slice access status information from the slice access control network element, a value of the flag bit corresponding to the network slice.

Step S303: The access management network element sends a second session establishment request message to a session management network element. The second session establishment request message includes the identifier of the network slice and an overflow indication, and the overflow indication indicates that the terminal device or the first session accesses the network slice in an overflow state. In addition, the second session establishment request message may further include the identifier (namely, a PDU session ID) of the first session and a subscription permanent identifier SUPI. The subscription permanent identifier one-to-one corresponds to the user identifier in the first session establishment request.

In this embodiment of this application, after determining that the network slice in which the first session establishment request message requests to establish the first session is in the overflow state, the access management network element may add the overflow indication to the first session establishment request message, to obtain the second session establishment request message, and then send the second session establishment request message to the session management network element. It may be understood that the second session establishment request message is also used to request to establish the first session of the terminal device. Because the network slice is in the overflow state in this case, the first session that the terminal requests to establish may access the network slice in the overflow state.

The overflow indication indicates that the terminal device or the first session accesses the network slice in the overflow state, and the overflow indication may further indicate other information, for example, a specific overflow state of the network slice when the terminal device or the first session accesses the network slice, for example, whether a quantity of terminals that access the slice exceeds a limit or a quantity of sessions in the slice exceeds a limit.

In an embodiment, the overflow indication may indicate an overflow parameter, that is, a parameter in the slice access status information is in the overflow state. For example, the overflow indication may include parameters in the slice access status information and indication information corresponding to the parameters, and the indication information corresponding to the parameters separately indicates whether each parameter is in an overflow state. For example, 4 bits are set to indicate overflow statuses of a quantity of accessed terminals, a quantity of sessions, a traffic bandwidth, a terminal density, separately. When a corresponding bit is set to 0, it indicates that a parameter exceeds a limit, and when the corresponding bit is set to 1, it indicates that a parameter does not exceed a limit. For another example, the overflow indication may include a list of parameters in the overflow state, and the parameter list includes only overflow parameters in the slice access status information.

For example, if only a quantity of users and a bandwidth are in the overflow state currently, the overflow parameter list may be Restricted list [Active User Number, Authorized Bandwidth].

Optionally, the overflow indication may further include slice access status information of the network slice.

Step S304: The session management network element receives the second session establishment request message from the access management network element.

Step S305: The session management network element sends a first request message to a policy control network element. The first request message includes the identifier of the network slice and the overflow indication, the overflow indication indicates that the terminal device or the first session accesses the network slice in the overflow state, and the first request message is used to request first session policy control information associated with the first session.

In this embodiment of this application, after receiving the second session establishment request message from the access management network element, the session management network element may send the first request message to the policy control network element. The first request message carries the identifier of the network slice and the overflow indication obtained from the second session establishment request message, to request the policy control network element to formulate, based on the overflow indication, a corresponding session management policy for the first session accessed in the overflow state. The identifier of the network slice is an identifier of a network slice of the first session that the terminal device requests to establish, and the identifier of the network slice may be, for example, S-NSSAI. For an implementation of the overflow indication, refer to step S303.

The first request message is used to request the first session policy control information associated with the first session. The first request message may also be referred to as a session management policy association establishment request message or a session management policy association update request message, or may have another name. This is not limited in this application.

Optionally, the first request message may further include the identifier (namely, a PDU session ID) of the first session and/or the identifier (namely, a UE ID) of the terminal device. For example, the identifier of the terminal device may be a subscription permanent identifier (SUPI). In addition, the first request message may further carry subscribed bandwidth information (session-aggregate maximum bit rate, session-AMBR).

Step S306: The policy control network element receives the first request message from the session management network element.

Step S307: The policy control network element generates the first session policy control information based on the overflow indication.

In this embodiment of this application, the policy control network element may make a policy decision based on information such as the overflow indication, the identifier (for example, an SUPI) of the terminal device, subscription configuration information of the network slice, and an operator configuration, and generate the first session policy control information for the first session. The first session policy control information may include session-level policy control information, a session rule, and flow-level policy control information, a PCC rule, which are respectively used to perform policy control for a session and a service flow. The policy control may include aspects such as QoS control (for example, a bandwidth and a scheduling priority), charging control (for example, a charging rate and a charging mode), and flow forwarding control (for example, target application access point information).

Step S308: The policy control network element sends a first response message to the session management network element. The first response message includes the first session policy control information.

The first response message is used to provide the first session policy control information for the session management network element in response to the first request message sent by the session management network element. The first response message may also be referred to as a session management policy association establishment response message or a session management policy association update response message, or may have another name. This is not limited in this application.

Step S309: The session management network element receives the first response message from the policy control network element.

Step S310: The session management network element performs policy control on the first session based on the first session policy control information obtained from the first response message.

In this embodiment of this application, after receiving the first response message from the policy control network element, the session management network element may send a session establishment response message to the access management network element. The session establishment response message is used to respond to the second session establishment request message sent by the access management network element. Then, the access management network element may receive the session establishment response message, and send the session establishment response message to the terminal device.

To update session policy control information associated with the first session in a timely manner, in step S307, the policy control network element may further decide, based on the overflow indication, to subscribe to an event that the terminal device, the first session, or the network slice cancels the overflow state. The policy control network element may subscribe to the event that the terminal device, the first session, or the network slice cancels the overflow state from the session management network element, so that the session management network element reports a report of overflow state cancellation event in a timely manner. Alternatively, the policy control network element may directly subscribe to the event that the terminal device, the first session, or the network slice cancels the overflow state from the access management network element or the slice access control network element. This is not limited in this application.

Figure 4:
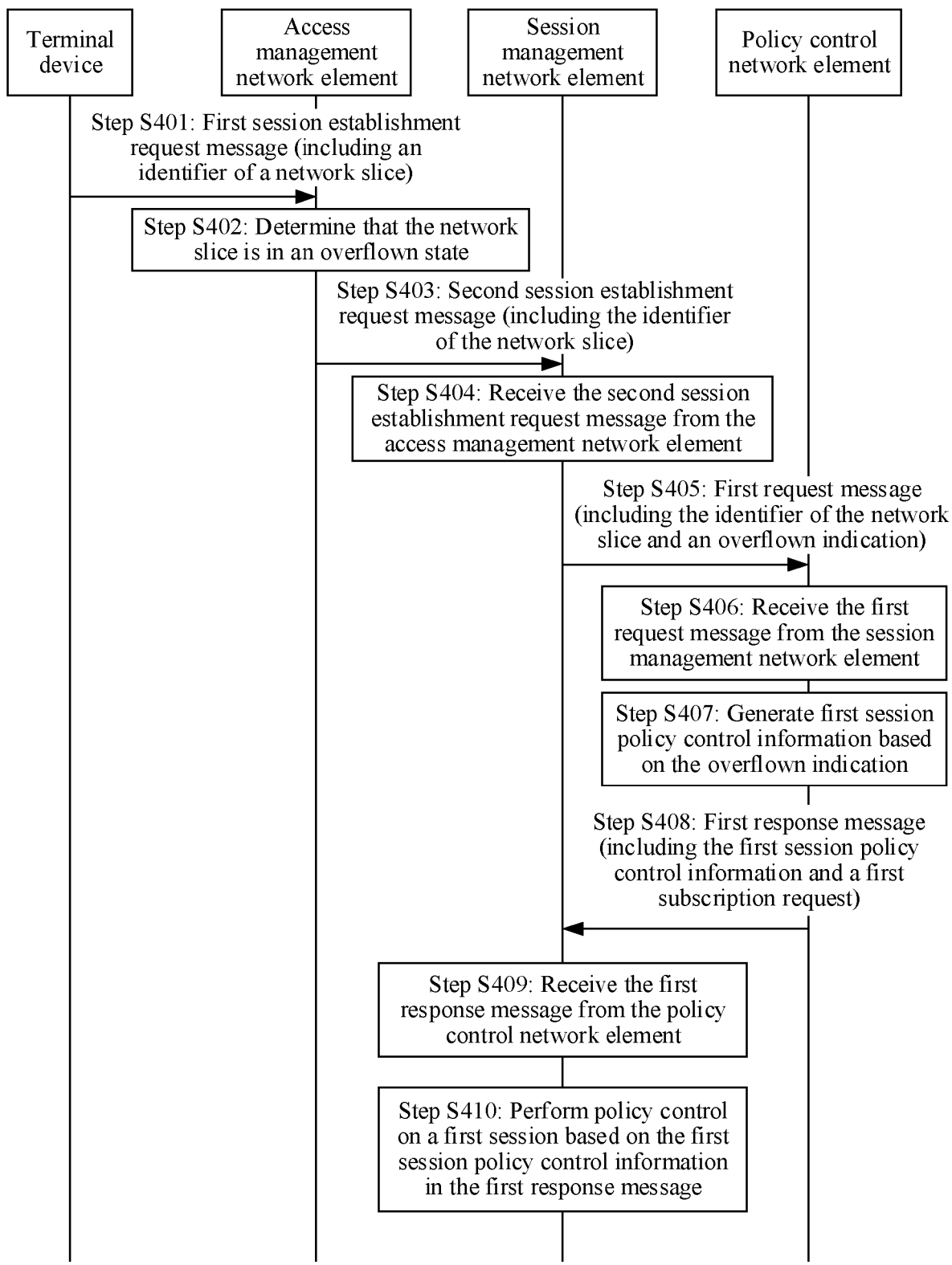
FIG. 4 is a diagram of subscribing to an overflow state cancellation event by a policy control network element from a session management network element according to an embodiment of this application.

If the policy control network element subscribes to the event that the terminal device, the first session, or the network slice cancels the overflow state from the session management network element, as shown in FIG. 4, in step S408, the policy control network element may send the first response message carrying a first subscription request to the session management network element. The first subscription request is used to subscribe to the event that the terminal device, the first session, or the network slice cancels the overflow state. Optionally, the first subscription request may include one or more pieces of information of the identifier (for example, an SUPI) of the terminal device, the identifier (for example, a PDU session ID) of the first session, and the identifier (for example, S-NSSAI) of the network slice. Optionally, the first subscription request may also include an association identifier of a session management policy, and the association identifier is used to identify a group of a terminal device, a first session, and a network slice that are associated. In FIG. 4, the implementations of step S401 to step S407, step S409, and step 410 are the same as those of step S301 to step S307, step S309, and step S310 in FIG. 3, and details are not described herein again.

The first subscription request may further include one or more triggers for the overflow state cancellation event. The trigger may indicate a subscription event type. The subscription event type is an event that access terminal quantity cancels the overflow state, an event that a session quantity cancels the overflow state, an event that a traffic bandwidth cancels the overflow state, an event that a terminal density cancels the overflow state, or the like. During implementation, if the overflow indication indicates a plurality of overflow states, that is, if a plurality of parameters in the slice access status information of the network slice are in an overflow state, the first subscription request may include a trigger for the overflow state cancellation event and a corresponding overflow parameter list. When the overflow state of one or more parameters in the overflow parameter list is cancelled, the trigger for the overflow state cancellation event may trigger reporting of the overflow state cancellation event corresponding to the overflow parameters. Alternatively, if the overflow indication indicates a plurality of overflow states, that is, if a plurality of parameters in the slice access status information of the network slice are in an overflow state, the first subscription request may also include a plurality of overflow state cancellation event triggers corresponding to the overflow parameters, and the overflow state cancellation event triggers are separately used to trigger reporting of an overflow state cancellation report for each overflow parameter.

The overflow state cancellation event trigger is used to trigger reporting of an overflow state cancellation report when an overflow state cancellation event occurs. The overflow state trigger event may be an overflow state cancellation event of the terminal device, an overflow state cancellation event of the first session, an overflow state cancellation event of the network slice, or an overflow state cancellation event of another parameter in the slice access status information. In other words, the overflow state cancellation event in this embodiment of this application may be at a level of a terminal device, a session, or a slice.

Figure 5:
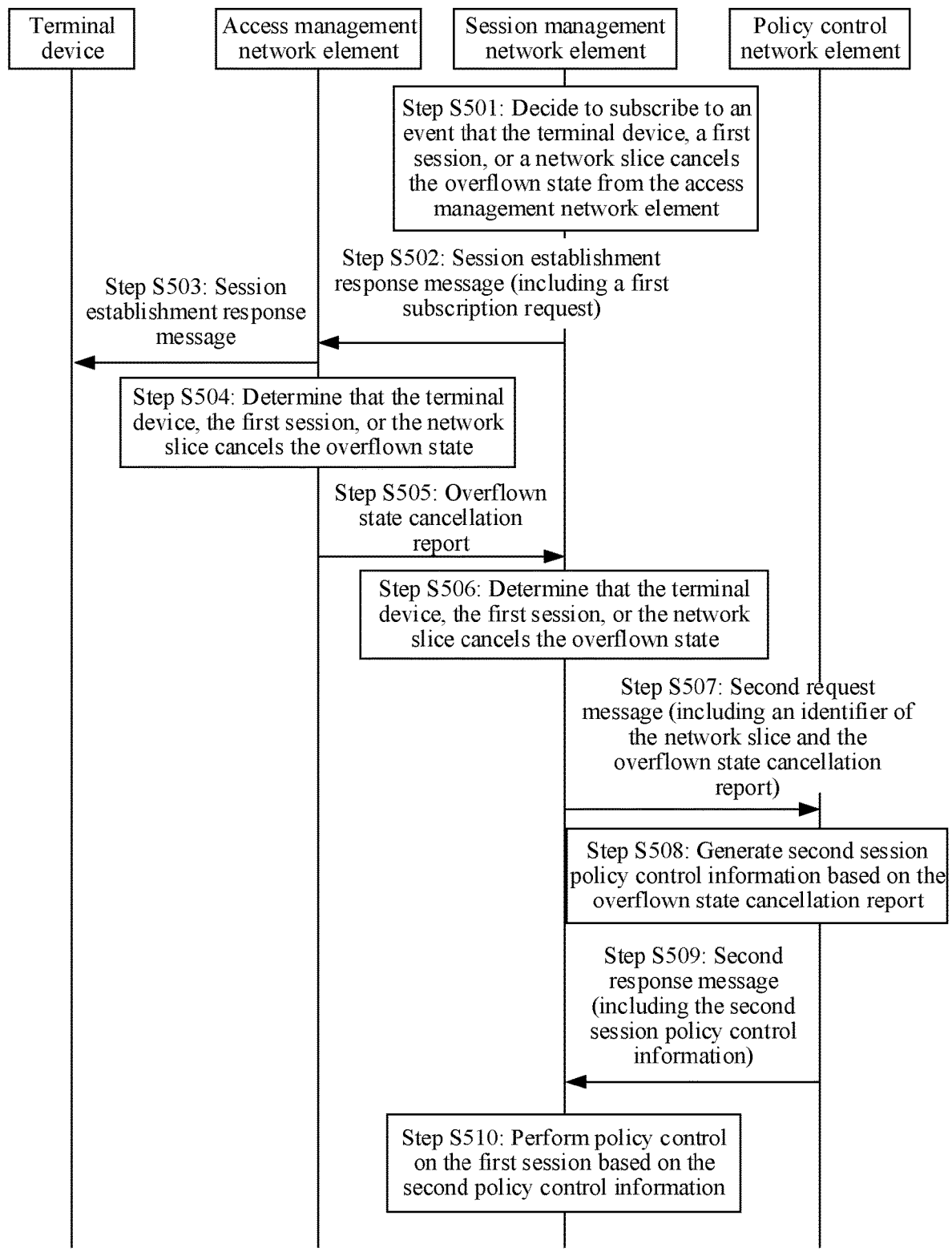
FIG. 5 is a diagram of subscribing to an overflow state cancellation event by a session management network element from an access management network element according to an embodiment of this application.

In an embodiment, as shown in FIG. 5, after receiving the first response message, the session management network element may decide, based on the first subscription request in the first response message, to subscribe to the event that the terminal device, the first session, or the network slice cancels the overflow state from the access management network element, and send the first subscription request to the access management network element. For example, the session management network element may use a session establishment response message to be sent to the access management network element to carry the first subscription request. In this way, after determining that the terminal device, the first session, or the network slice cancels the overflow state, the access management network element may send the report of the overflow state cancellation event to the session management network element, to notify the session management network element that the terminal device, the first session, or the network slice cancels the overflow state. Optionally, the report of overflow state cancellation event may indicate an overflow state cancellation event. For the foregoing content, refer to step S501 to step S505 in FIG. 5. However, it should be noted that the session management network element may alternatively send the first subscription request to the access management network element by using another message. This is not limited in this application. In other words, a manner of sending the first subscription request shown in FIG. 5 is merely an example.

In this embodiment of this application, that the access management network element determines that the terminal device, the first session, or the network slice cancels the overflow state may include the following cases: The access management network element receives updated slice access status information of the network slice from the slice access control network element, and determines, based on the updated slice access status information of the network slice, that the terminal device, the first session, or the network slice cancels the overflow state; or the access management network element receives the report of the event that the terminal device, the first session, or the network slice cancels the overflow state from the slice access control network element, to determine that the terminal device, the first session, or the network slice cancels the overflow state; or the access management network element determines, based on a quantity of terminal devices accessing the network slice in a current area, that the terminal device, the first session, or the network slice cancels the overflow state.

That the access management network element determines that the terminal device, the first session, or the network slice cancels the overflow state may further include the following cases: The access management network element obtains a new quota from the slice access control network element, and determines that users/sessions corresponding to the quota can be adjusted to a non-overflow state, to determine that the terminal device or the first session cancels the overflow state; or the access management network element obtains the current slice access status information of the network slice from the slice access control network element, and adjusts all users/sessions served by the network slice to the non-overflow state if the network slice has cancelled the overflow state; or the access management network element receives, from the slice access control network element, a user-level or session-level overflow state cancellation report, and the report of the overflow state cancellation event indicates that the terminal device or the first session cancels the overflow state.

It may be understood that the overflow state cancellation event of the terminal device may be triggered when the overflow state of the terminal device is canceled, and the overflow state cancellation event of the first session may be triggered when the overflow state of the first session is canceled. The two may respectively correspond to user-level and session-level overflow state cancellation reports. That the overflow state of the terminal device or the first session is canceled may include the following two cases:

In a first case, the overflow state of the network slice is cancelled, and the terminal device or the first session may access the network slice in a non-overflow state (which may also be understood as a normal state). Therefore, the overflow state of the terminal device or the first session is canceled. It should be noted that this does not mean that the terminal device or the first session should re-access the network slice in the non-overflow state, but means that the terminal device or the first session can be restored to access in the non-overflow state. The network may perform policy control on the first session according to a normal session management policy, for example, perform policy charging control on the first session according to a policy charging rule in the slice subscription information, and adjust a bandwidth that can be used by the first session to a sub- scribed bandwidth value in the slice subscription information. In other words, different session management policies may be used when the terminal device or the first session accesses the network slice in the overflow state and the non-overflow state.

In a second case, the overflow state of the network slice is not canceled. However, because another terminal device or session releases a service in the network slice, the terminal device and the first session can be restored to access the network slice in a non-overflow state. Therefore, the overflow state of the terminal device or the first session is canceled.

The overflow state cancellation event of the network slice may be triggered when the overflow state of the network slice is canceled, and corresponds to a slice-level overflow state cancellation report. That the overflow state of the network slice is canceled means that each parameter in the slice access status information of the network slice is less than a corresponding maximum value allowed by configuration. That is, each parameter in the slice access status information is restored to a non-overflow state. It may be understood that when the overflow state of the network slice is canceled, the overflow state of the terminal device and the overflow state of the first session are also canceled at the same time.

Further, in step S506, the session management network element may determine, based on the report of the overflow state cancellation event received from the access management network element, that the terminal device, the first session, or the network slice cancels the overflow state. Subsequently, in step S507, the session management network element may send a second request message to the policy control network element. The second request message carries the report of the overflow state cancellation event, to notify the policy control network element that the terminal device, the first session, or the network slice cancels the overflow state, and request the policy control network element to formulate, based on the report of the overflow state cancellation event, a new session management policy for the first session that is restored to access in the non-overflow state. Optionally, the report of the overflow state cancellation event may indicate an overflow state cancellation event.

The second request message is used to request the policy control network element to update the session policy control information associated with the first session. Alternatively, the second request message is used to request second session policy control information associated with the first session, and the second session policy control information is updated session policy control information associated with the first session. The second request message may also be referred to as a session management policy update request message, or may have another name. This is not limited in this application.

In step S508 and step S509, after receiving the second request message from the session management network element, the policy control network element may generate, based on the report of the overflow state cancellation event in the second request message, the second session policy control information associated with the first session, and send a second response message that carries the second session policy control information to the session management network element. The second response message is used to respond to the second request message sent by the session management network element. The second response message may also be referred to as a session management policy update response message, or may have another name. This is not limited in this application. Correspondingly, in step S510, the session management network element may receive the second response message from the policy control network element, and perform policy control on the first session based on the second session policy control information in the second response message.

Figure 6:
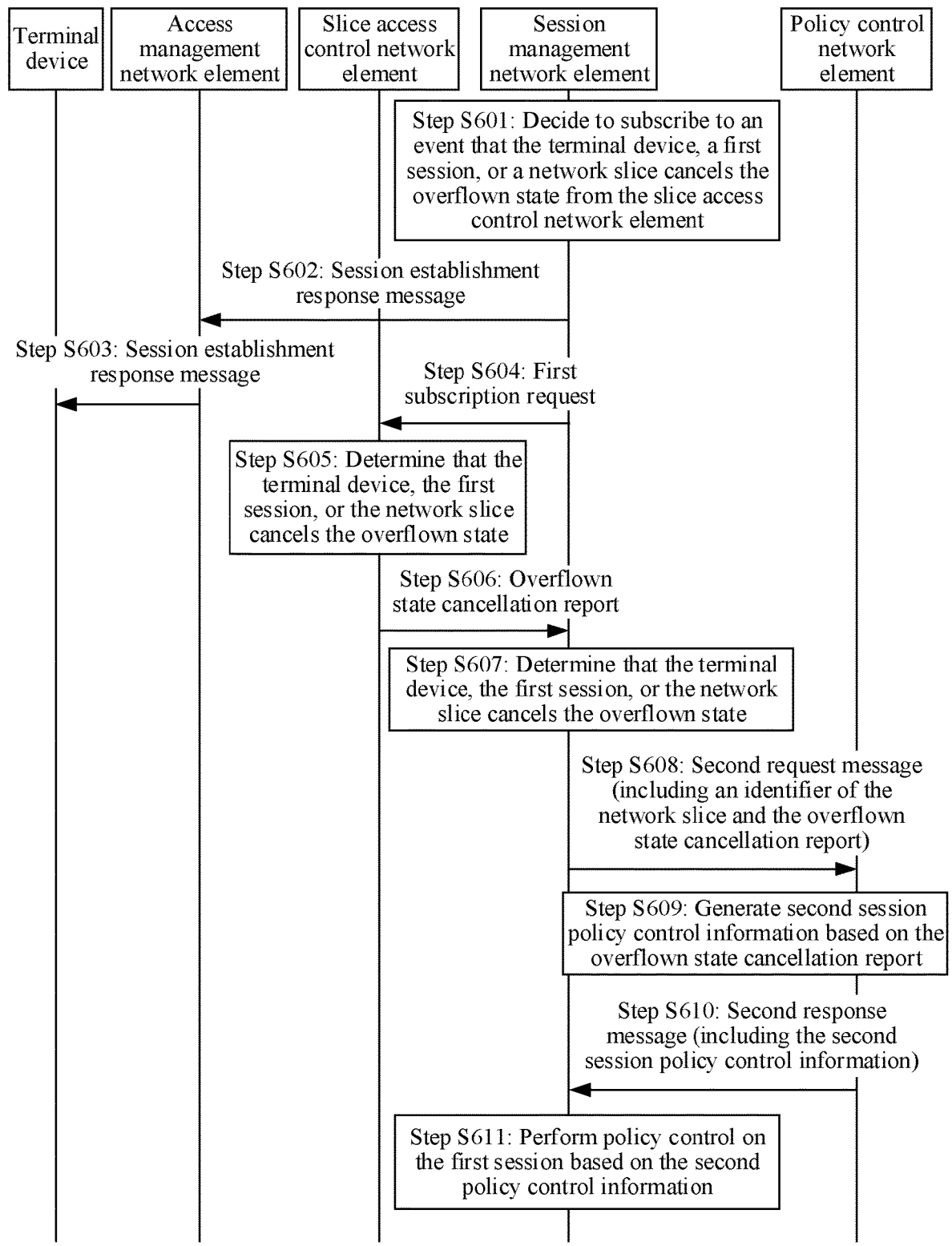
FIG. 6 is a diagram of subscribing to an overflow state cancellation event by a session management network element from a slice access control network element according to an embodiment of this application.

In another embodiment, as shown in FIG. 6, after receiving the first response message, the session management network element may decide, based on the first subscription request in the first response message, to subscribe to the event that the terminal device, the first session, or the network slice cancels the overflow state from the slice access control network element, and send the first subscription request to the slice access control network element. In this way, after determining, based on the slice access status information of the network slice, that the terminal device, the first session, or the network slice cancels the overflow state, the slice access control network element may send an overflow state cancellation report to the session management network element, to notify the session management network element that the terminal device, the first session, or the network slice cancels the overflow state. Optionally, the report of overflow state cancellation event may indicate an overflow state cancellation event. For the foregoing content, refer to step S601 to step S606 in FIG. 6.

Then, in step S607, the session management network element may determine, based on the report of the overflow state cancellation event received from the slice access control network element, that the terminal device, the first session, or the network slice cancels the overflow state. Optionally, the slice access control network element may further send current slice access status information of the network slice to the session management network element while sending the report of the overflow state cancellation event to the session management network element.

It should be noted that in this implementation, the action of sending the first subscription request by the session management network element to the slice access control network element may be performed before, after, or while the session management network element sends the session establishment response message to the access management network element. This is not limited in this application. In other words, an execution sequence of step S602 and step S604 shown in FIG. 6 is merely an example.

It should be noted that, in this embodiment of this application, after receiving the first response message, the session management network element may also subscribe to the slice access status information of the network slice from the slice access control network element. In this way, the session management network element may determine, based on the updated slice access status information of the network slice that is received from the slice access control network element, that the terminal device, the first session, or the network slice cancels the overflow state, and does not need to receive the report of the overflow state cancellation event from the slice access control network element. Optionally, in this scenario, the session management network element may generate the report of the overflow state cancellation event.

That the session management network element determines that the terminal device, the first session, or the network slice cancels the overflow state may include the following cases: The session management network element obtains a new quota from the slice access control network element, and determines that users/sessions corresponding to the quota can be adjusted to a non-overflow state, to determine that the overflow state of the terminal device or the first session is canceled; or the session management network element obtains the current slice access status information of the network slice from the slice access control network element, and adjusts all users/sessions served by the network slice to the non-overflow state if the overflow state of the network slice has been canceled; or the session management network element receives, from the slice access control network element, a user-level or session-level overflow state cancellation report, and the report of the overflow state cancellation event indicates that the overflow state of the terminal device or the first session is canceled.

Further, in step S607 and step S608, after determining that the terminal device, the first session, or the network slice cancels the overflow state, the session management network element may send a second request message to the policy control network element. The second request message carries the report of the overflow state cancellation event, to notify the policy control network element that the terminal device, the first session, or the network slice cancels the overflow state, and request the policy control network element to formulate, based on the report of the overflow state cancellation event, a new session management policy for the first session that is restored to access in the non-overflow state. Therefore, it may be understood that the second request message is used to request the policy control network element to update the session policy control information associated with the first session, or is used to request second session policy control information associated with the first session, and the second session policy control information is updated session policy control information associated with the first session. The second request message may also be referred to as a session management policy update request message, or may have another name. This is not limited in this application.

In step S609 and step S610, after receiving the second request message from the session management network element, the policy control network element may generate, based on the report of the overflow state cancellation event in the second request message, the second session policy control information associated with the first session, and send a second response message that carries the second session policy control information to the session management network element. The second response message is used to respond to the second request message. The second response message may also be referred to as a session management policy update response message, or may have another name. This is not limited in this application. Correspondingly, in step S611, the session management network element may receive the second response message from the policy control network element, and perform policy control on the first session based on the second session policy control information in the second response message.

Figure 7:
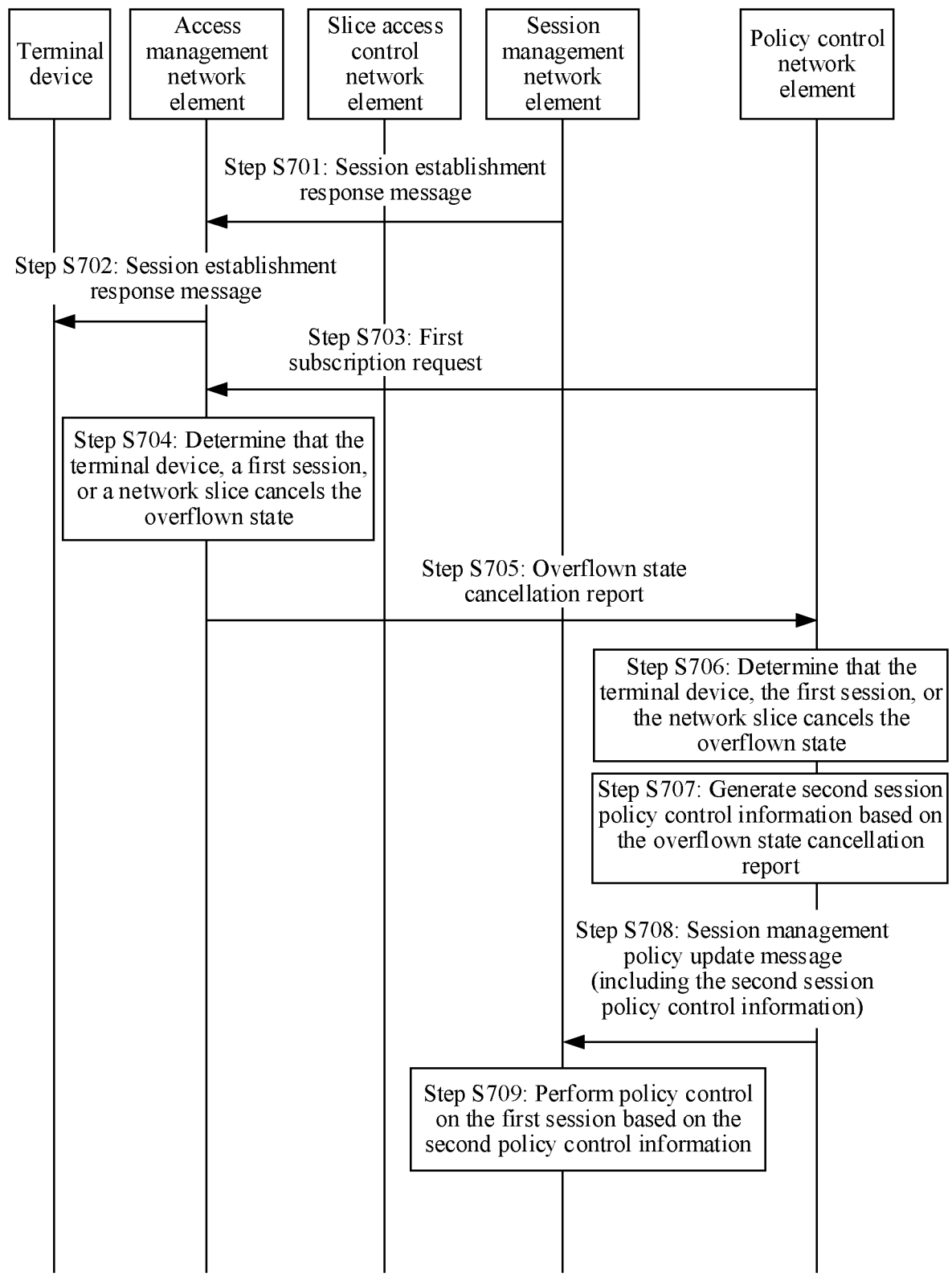
FIG. 7 is a diagram of subscribing to an overflow state cancellation event by a policy control network element from an access management network element according to an embodiment of this application.

If the policy control network element subscribes to the overflow state cancellation event of the network slice from the access management network element, as shown in FIG. 7, in step S703, the policy control network element may send a first subscription request to the access management network element. The first subscription request is used to subscribe to the event that the terminal device, the first session, or the network slice cancels the overflow state. In addition to one or more overflow state cancellation event triggers, optionally, the first subscription request may further include one or more pieces of information of the identifier (for example, an SUPI) of the terminal device, the identifier (namely, a PDU session ID) of the first session, and the identifier (for example, S-NSSAI) of the network slice. The overflow state cancellation event trigger is used to trigger reporting of an overflow state cancellation report when an overflow state cancellation event occurs. The overflow state trigger event may be an overflow state cancellation event of the terminal device, an overflow state cancellation event of the first session, an overflow state cancellation event of the network slice, or an overflow state cancellation event of another parameter in the slice access status information. In other words, the overflow state cancellation event in this embodiment of this application may be at a level of a terminal device, a session, or a slice.

In this way, in step S704 and step S705, after determining that the terminal device, the first session, or the network slice cancels the overflow state, the access management network element may send the report of the overflow state cancellation event to the policy control network element, to notify the policy control network element that the terminal device, the first session, or the network slice cancels the overflow state.

It should be noted that, in this case, the action (namely, step S703 shown in FIG. 7) of sending the first subscription request by the policy control network element to the access management network element may be performed before, after, or while the action (namely, step S308 shown in FIG. 3) of sending the first response message by the policy control network element to the session management network element is performed. This is not limited in this application. In addition, the action of sending the session establishment response message by the session management network element to the access management network element and the action of sending the session establishment response message by the access management network element to the terminal device may be performed after the action of sending the first response message by the policy control network element to the session management network element. A sequence of the two actions and the action of sending the first subscription request by the policy control network element to the access management network element is not limited. That is, a sequence of performing steps S701, S702, and S703 shown in FIG. 7 is merely an example, and the sequence of performing steps S701, S702, and S703 is not strictly limited in this application.

That the access management network element determines that the overflow state of the network slice is canceled may include the following cases: The access management network element receives updated slice access status information of the network slice from the slice access control network element, and determines, based on the updated slice access status information of the network slice, that the terminal device, the first session, or the network slice cancels the overflow state; or the access management network element receives the report of the overflow state cancellation event from the slice access control network element, to determine that the terminal device, the first session, or the network slice cancels the overflow state; or the access management network element determines, based on a quantity of terminal devices accessing the network slice in a current area, that the terminal device, the first session, or the network slice cancels the overflow state.

That the access management network element determines that the terminal device, the first session, or the network slice cancels the overflow state may further include the following cases: The access management network element obtains a new quota from the slice access control network element, and determines that users/sessions corresponding to the quota can be adjusted to a non-overflow state, to determine that the overflow state of the terminal device or the first session is canceled; or the access management network element obtains the current slice access status information of the network slice from the slice access control network element, and adjusts all users/sessions served by the network slice to the non-overflow state if the overflow state of the network slice has been canceled; or the access management network element receives, from the slice access control network element, a user-level or session-level overflow state cancellation report, and the report of the overflow state cancellation event indicates that the overflow state of the terminal device or the first session is canceled.

Further, in step S706 and step S707, after receiving the report of the overflow state cancellation event from the access management network element, the policy control network element may generate second session policy control information associated with the first session. The second session policy control information is updated session policy control information associated with the first session. Then, in step S708, the policy control network element may send a session management policy update message to the session management network element. The session management policy update message includes the second session policy control information. In step S709, the session management network element may receive the session management policy update message from the policy control network element, and perform policy control on the first session based on the second session policy control information in the session management policy update message.

It may be understood that in this embodiment of this application, one terminal device may access one network slice by using a plurality of session management network elements. If the policy control network element subscribes to the overflow state cancellation event of the network slice from the session management network element, it means that a plurality of session management network elements all need to monitor the overflow state cancellation event of the network slice. If the policy control network element subscribes to the overflow state cancellation event of the network slice from the access management network element, all of the plurality of session management network elements only need to forward the event to the access management network element node, and the access management network element monitors the event. In this way, efficiency and accuracy of updating the session policy control information by the policy control network element can be effectively improved.

Figure 8:
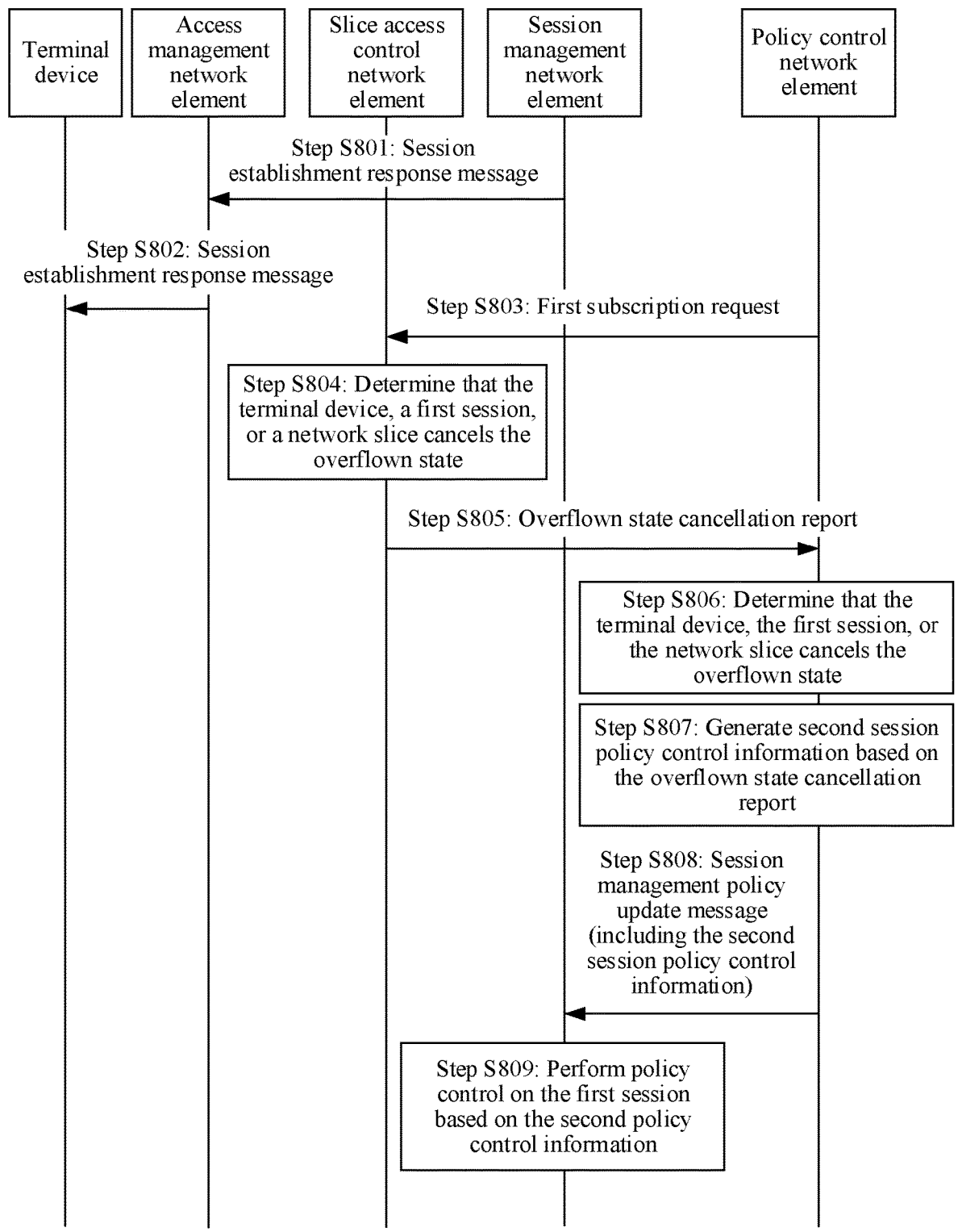
FIG. 8 is a diagram of subscribing to an overflow state cancellation event by a policy control network element from a slice access control network element according to an embodiment of this application.

If the policy control network element subscribes to the overflow state cancellation event of the network slice from the slice access control network element, as shown in FIG. 8, in step S803, the policy control network element may send a first subscription request to the slice access control network element. In this way, in step S804 and step S805, after determining that the terminal device, the first session, or the network slice cancels the overflow state, the slice access control network element may send the report of the event that the network slice cancels the overflow state to the policy control network element, to notify the policy control network element that the terminal device, the first session, or the network slice cancels the overflow state.

It should be noted that, in this case, the action (namely, step S803 shown in FIG. 8) of sending the first subscription request by the policy control network element to the slice access control network element may be performed before, after, or while the action (namely, step S308 shown in FIG. 3) of sending the first response message by the policy control network element to the session management network element is performed. This is not limited in this application. Similarly, the action of sending the session establishment response message by the session management network element to the access management network element and the action of sending the session establishment response message by the access management network element to the terminal device may be performed after the action of sending the first response message by the policy control network element to the session management network element. A sequence of the two actions and the action of sending the first subscription request by the policy control network element to the slice access control network element is not limited. That is, a sequence of performing steps S801, S802, and S803 shown in FIG. 8 is merely an example, and the sequence of performing steps S801, S802, and S803 is not strictly limited in this application.

That the policy control network element determines that the terminal device, the first session, or the network slice cancels the overflow state may further include the following cases: The policy control network element obtains a new quota from the slice access control network element, and determines that users/sessions corresponding to the quota can be adjusted to a non-overflow state, to determine that the overflow state of the terminal device or the first session is canceled; or the policy control network element obtains the current slice access status information of the network slice from the slice access control network element, and adjusts all users/sessions served by the network slice to the non-overflow state if the overflow state of the network slice has been canceled; or the policy control network element receives, from the slice access control network element, a user-level or session-level overflow state cancellation report, and the report of the overflow state cancellation event indicates that the overflow state of the terminal device or the first session is canceled.

Further, in step S806 and step S807, after receiving the report of the overflow state cancellation event from the slice access control network element, the policy control network element may generate second session policy control information associated with the first session. The second session policy control information is updated session policy control information associated with the first session. Then, in step S808, the policy control network element may send a session management policy update message to the session management network element. The session management policy update message includes the second session policy control information. In step S809, the session management network element may receive the session management policy update message from the policy control network element, and perform policy control on the first session based on the second session policy control information in the session management policy update message.

It should be noted that, different from an implementation of subscribing to the overflow state cancellation event of the network slice from the session management network element, because the slice access control network element is unaware of a current session context in the policy control network element, when the policy control network element subscribes to the overflow state cancellation event from the slice access management network element, in addition to the one or more overflow state cancellation event triggers, the first subscription request further needs to include one or more of the identifier (for example, an SUPI) of the terminal device, the identifier (namely, a PDU session ID) of the first session, and the identifier (for example, S-NSSAI) of the network slice, for describing a session in the network slice.

In this embodiment of this application, that the policy control network element directly subscribes to the overflow state cancellation event of the terminal device or the first session in the network slice from the slice access control network element may be as follows:

If a subscribed event is an access terminal quantity overflow cancellation event or a terminal density overflow cancellation event, the first subscription request may further carry the identifier (for example, an SUPI) of the terminal device. When determining that the overflow state of the terminal device can be canceled, the slice access control network element may send an event notification to the policy control network element. For example, a quantity of access terminals of a network slice is limited to 1000, and after an access upper limit is reached, a network allows another 200 users to access the network in an overflow state. After 100 users in the 1000 users that access the network in the non-overflow state are deregistered from the slice or release PDU sessions in the slice, an actual quantity of users accessing the network in this case is 1100. Although the network slice is still in the overflow state currently, 100 of the 200 users that access the network in the overflow state should be restored to access in the non-overflow state (for example, a preferential rate subscribed by a slice tenant is used for charging, and a subscribed bandwidth is used for service guarantee).

If the subscribed event is an access session quantity overflow state cancellation event or a maximum traffic bandwidth overflow state cancellation event, in addition to the identifier (for example, an SUPI) of the terminal device, the first subscription request may further carry the identifier (namely, a PDU session ID) of the first session, so that the slice access control network element determines a PDU session. When determining that the overflow state of the first session can be canceled, the slice access control network element may send an event notification to the policy control network element.

It can be learned that according to the foregoing technical solution provided in this embodiment of this application, the first request message sent by the session management network element to the policy control network element may include the overflow indication that indicates that the terminal device or the first session accesses the network slice in the overflow state. Therefore, the policy control network element can formulate corresponding session policy control information for the first session established in the overflow state, to support the terminal device in establishing a session in the overflow state of the network slice, and fully utilize network resources.

In addition, the policy control network element subscribes to the overflow state cancellation event of the overflow state network slice from the session management network element, the access management network element, or the slice access control network element, so that the policy control network element can learn of a change of the access status of the network slice in a timely manner, and therefore, update the session policy control information in a timely manner. In this way, the network can support dynamic policy and charging rules, to avoid a charging error caused when the session policy control information is not updated or is untimely updated, and avoid affecting user experience.

Figure 9:
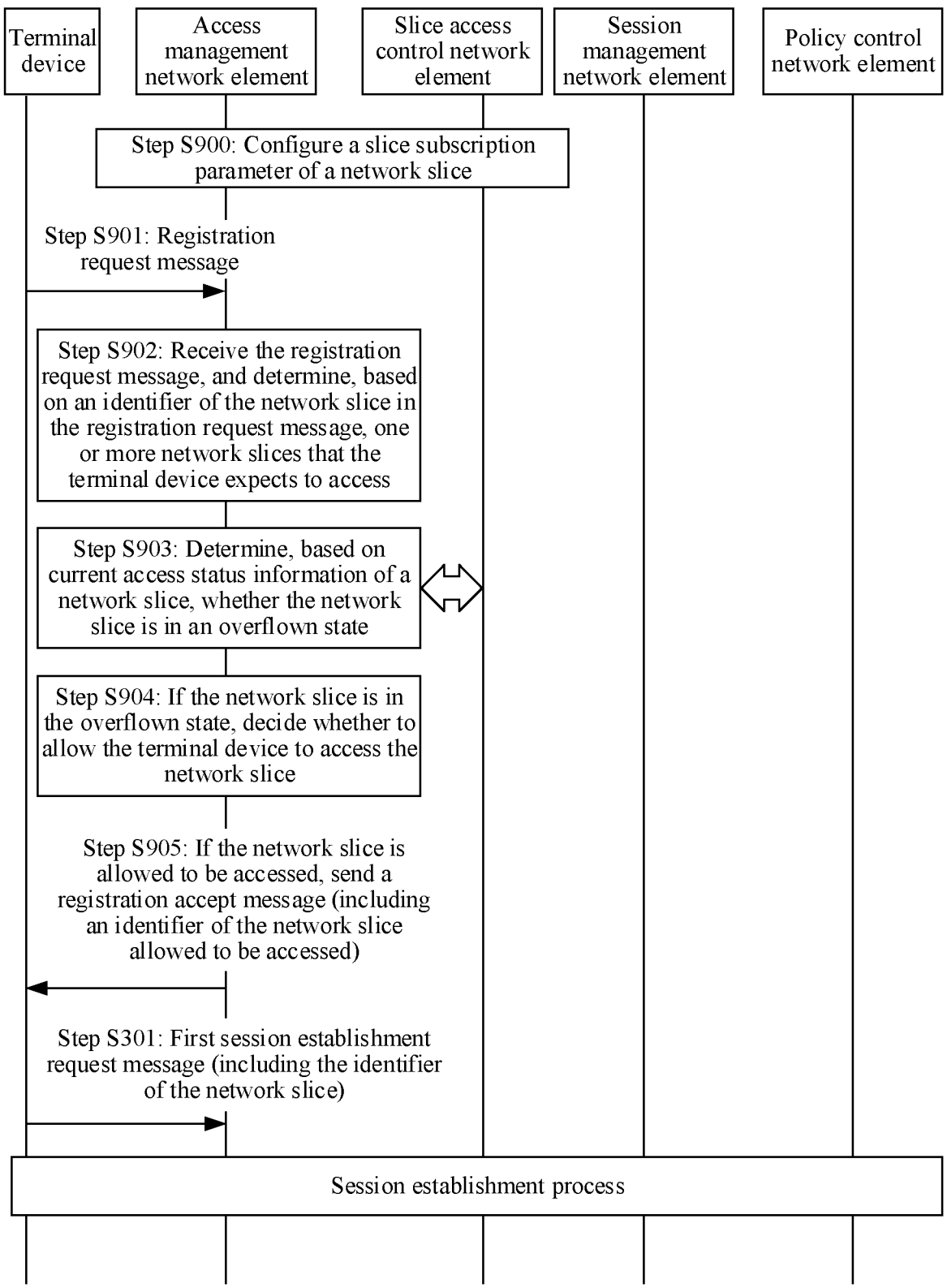
FIG. 9 is a diagram of a registration process of a terminal device according to an embodiment of this application.

In this embodiment of this application, before step S301, a registration procedure of the terminal device may be further included. As shown in FIG. 9, the registration procedure may include the following steps.

Step S900: A management plane entity (operation and management, OAM) configures a slice subscription parameter of the network slice for the slice access control network element or the access management network element of each slice area. The slice subscription parameter may include one or more of a maximum quantity of registered terminals, a maximum quantity of concurrent sessions, and a maximum traffic bandwidth. That is, a maximum value allowed by configuration corresponding to each parameter in the slice access status information of the network slice is also a specification attribute of the network slice.

In an embodiment, the management plane entity may separately configure, for each area, one or more of a maximum quantity of registered terminals, a maximum quantity of concurrent sessions, a maximum traffic bandwidth, and a terminal density that are supported in the area.

In another embodiment, the management plane entity may configure a terminal density supported by the entire network slice. That is, terminal densities of all areas are the same. The terminal densities may include one or more of a registered terminal density, a concurrent session density, or a traffic density. The access management network element in each area may determine, based on a configured terminal density supported by the entire network slice and a size of each area, the maximum quantity of registered terminals, the maximum quantity of concurrent sessions, and the maximum traffic bandwidth that are supported in the area.

In another embodiment, the management plane entity may configure, for each area, a terminal density supported by the area. That is, terminal densities of all areas may be different. The terminal densities may include one or more of the registered terminal density, the concurrent session density, or the traffic density. The access management network element in each area may determine, based on a terminal density configured in the area and a size of the area, the maximum quantity of registered terminals, the maximum quantity of concurrent sessions, and the maximum traffic bandwidth that are supported in the area.

Optionally, if the management plane entity configures the slice subscription parameter in the slice access control network element, the access management network element in each area may obtain the slice subscription parameter from the slice access control network element.

Step S901: The terminal device sends a registration request message to the access management network element through an access network device. The registration request message includes identifiers of one or more network slices that the terminal device expects to access.

The identifier of the network slice may be S-NSSAI, and the network slice that the terminal device expects to access may also be referred to as a target network slice or a target slice.

Optionally, the registration request message may further include one or more of the identifier (for example, an SUPI) of the terminal device, an identifier of a cell in which the terminal device is currently located, and an identifier of a TA in which the terminal device is currently located.

Step S902: The access management network element receives the registration request message, and determines, based on the identifiers of the one or more network slices included in the registration request message, the one or more network slices that the terminal device expects to access.

Step S903: The access management network element determines, based on current slice access status information of a network slice, whether the network slice is in the overflow state.

In this embodiment of this application, the access management network element may obtain the current slice access status information of the network slice from the slice access control network element. The slice access status information includes one or more of a current quantity of access terminals, a quantity of sessions, a traffic bandwidth, and a terminal density in the network slice. If one or more parameters (for example, the quantity of access terminals or the quantity of sessions) in the current slice access status information of the network slice exceed a corresponding maximum value allowed by configuration, the access management network element may determine that the network slice is currently in the overflow state; otherwise, the access management network element determines that the network slice is not in the overflow state.

Optionally, the access management network element may store the current slice access status information of the network slice received from the slice access control network element. The access management network element may further subscribe to the slice access status information of the network slice from the slice access control network element, so that the slice access control network element can send the updated slice access status information of the network slice to the access management network element when an access status of the network slice changes. In this way, accuracy of the slice access status information of the network slice stored in the access management network element can be ensured.

If the network slice is in the overflow state, the access management network element may further store or set, in a memory, an overflow state flag corresponding to the network slice, so that when initiating a session establishment procedure in the network slice, the terminal device may directly determine that the network slice is in the overflow state. For an implementation of the overflow state flag, refer to the foregoing description.

Step S904: If the network slice is in the overflow state, the access management network element decides, based on information such as the current slice access status information of the network slice, a network load status of a current area, a slice subscription parameter of the network slice, and an operator configuration, to allow the terminal device to access the network slice.

It may be understood that if the network slice is in the overflow state, the access management network element may also reject access of the terminal device to the network slice. This is not limited in this application. If the network slice is not in the overflow state, the access management network element may allow access of the terminal device to the network slice.

It should be noted that the access management network element may perform step S903 and step S904 for each network slice that the terminal device requests to access in the registration request message, to determine whether the network slice is in the overflow state and whether the terminal device is allowed to access the network slice.

Step S905: The access management network element sends a registration accept message to the terminal device. The registration accept message includes one or more network slices that the terminal device is allowed to access, and indicates that the terminal device is allowed to initiate a session establishment procedure in these network slices.

Further, after receiving the registration accept message, the terminal device may initiate a session establishment procedure for one or more network slices that are allowed to be accessed by the terminal device. In other words, the terminal device may perform step S301 after step S904, to send the first session establishment request message to the access management network element. However, it should be understood that the network slice in which the first session request message requests to establish a session is one of one or more network slices that the access management network element allows the terminal device to access in the registration accept message. In other words, if the terminal device determines to establish sessions in a plurality of network slices, the terminal device may initiate a session establishment request procedure for each network slice that the access management network element allows the terminal device to access. For a subsequent session establishment procedure, refer to descriptions in FIG. 3 to FIG. 8.

It can be learned that according to the foregoing technical solution, the terminal device can be supported in accessing a network slice in an overflow state and initiating a session establishment procedure, so that network resources are fully utilized.

Embodiment 2

An embodiment of this application further provides another slice control method. A main difference between this slice control method and the slice control method provided in Embodiment 1 lies in that a session management network element may make a slice access decision. After receiving a session establishment request message from a terminal device, an access management network element does not need to determine whether a network slice is in an overflow state, and the session establishment request message sent by the access management network element to the session management network element may not include an overflow indication. After receiving the session establishment request message from the access management network element, the session management network element may determine whether the network slice is in an overflow state, and decide whether to allow to establish a session in the overflow state.

Figure 10:
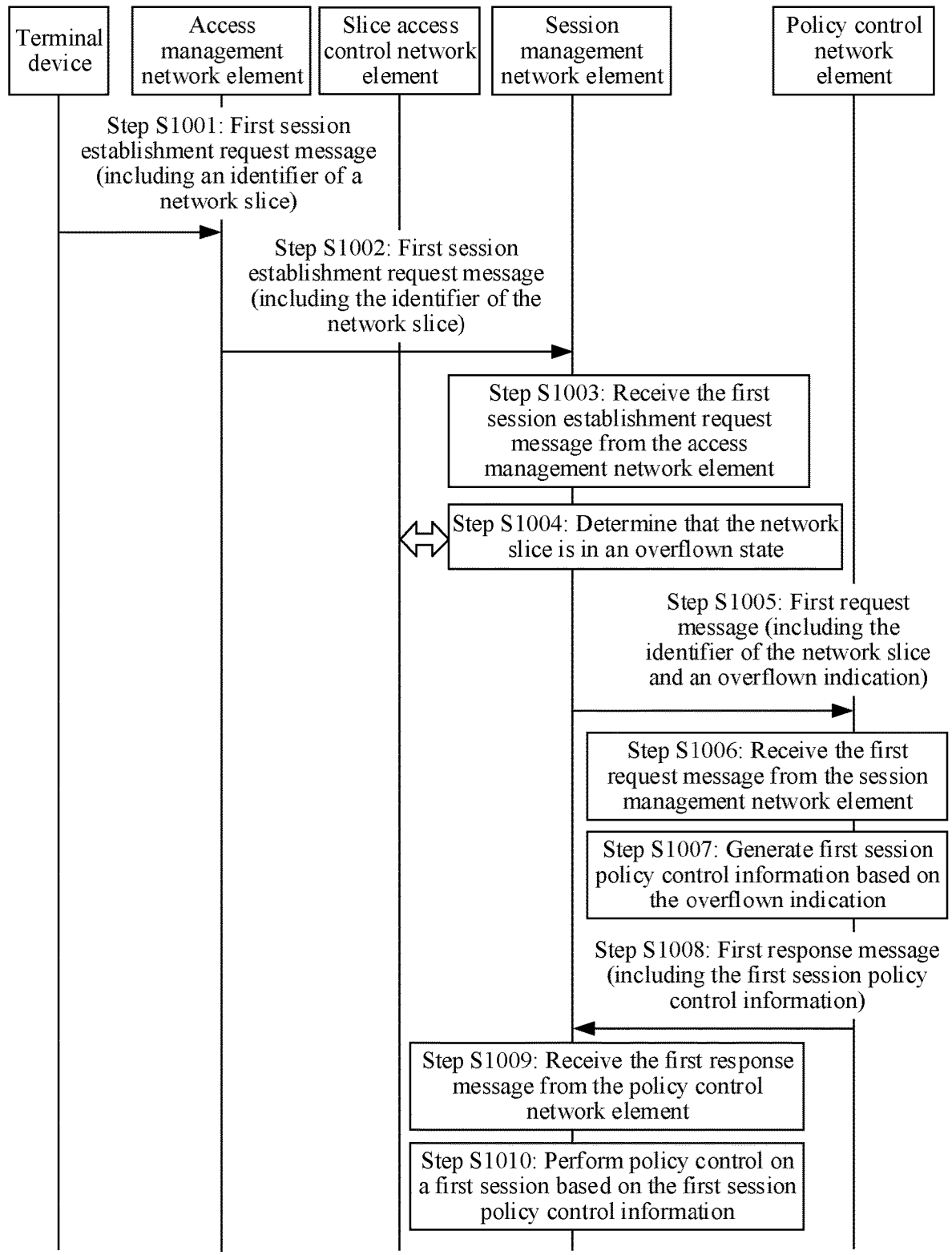
FIG. 10 is a flowchart of another slice control method according to an embodiment of this application.

FIG. 10 is a flowchart of another slice control method according to an embodiment of this application. The method in this embodiment includes the following steps.

Step S1001: The access management network element receives a first session establishment request message from the terminal device. The first session establishment request message includes an identifier of the network slice, and the first session establishment request message is used to request to establish a first session of the terminal device.

After receiving the first session establishment request message from the terminal device, the access management network element may determine, based on the identifier (for example, S-NSSAI) of the network slice in the first session establishment request message, a network slice in which the first session needs to be established.

Optionally, the first session establishment request message may include an identifier (for example, an SUPI) of the terminal device and/or an identifier (namely, a PDU session ID) of the first session.

Optionally, before step S1001, a general registration procedure of the terminal device may be further included. The general registration procedure means that UE sends a registration request message to an AMF through an access network device, and the AMF interacts with an AUSF and the like to perform authentication and verification on a user request. After the verification succeeds, the AMF may obtain subscription data from a UDM based on an SUPI/SUCI. After receiving the request, the UDM may obtain actual subscription data from a UDR. In addition, the AMF may further initiate a UE policy control creation request (UEPolicyControl_Create) message and an access management policy control creation request (AMPolicyControl_Create) message to a PCF, to separately obtain a UE policy and an access control policy. In this process, the PCF returns the access control policy to the AMF, and provides the UE policy to the UE through the AMF. In addition, the AMF may further decide information (Allowed NSSAI) of a slice that the UE is allowed to access for the UE based on information such as the registration request and user subscription, and provide the information for the UE in a registration response message.

Step S1002: The access management network element sends the first session establishment request message to the session management network element.

A difference between step S1002 and step S303 in Embodiment 1 lies in that because the access management network element does not need to determine whether the network slice is in the overflow state, the session establishment request message sent by the access management network element to the session management network element does not include the overflow indication. In other words, the access management network element may directly forward the first session establishment request message received from the terminal device to the session management network element.

Step S1003: The session management network element receives the first session establishment request message from the access management network element.

Step S1004: The session management network element determines, based on the identifier of the network slice, that the network slice is in the overflow state.

After receiving the first session establishment request message from the access management network element, the session management network element obtains current slice access status information of the network slice from a slice access control network element, for example, a current quantity of terminal devices accessing in the network slice, a quantity of established session connections, a traffic bandwidth, and a terminal density. If one or more parameters (for example, a quantity of access terminals or a quantity of sessions) in the current slice access status information of the network slice exceed a corresponding maximum value allowed by configuration, the session management network element may determine that the network slice is currently in the overflow state.

On this basis, the session management network element may still decide, based on information such as the slice access status information, slice subscription information, an operator configuration, and a current network load status of the network slice in the overflow state of the network slice, to accept the first session establishment request, and allow the terminal device to establish the first session.

Step S1005: The session management network element sends a first request message to a policy control network element. The first request message includes the identifier of the network slice and the overflow indication, the overflow indication indicates that the terminal device or the first session accesses the network slice in an overflow state, and the first request message is used to request first session policy control information associated with the first session.

The first request message may also be referred to as a session management policy association establishment request message or a session management policy association update request message, or may have another name. This is not limited in this application.

Optionally, the identifier of the network slice in the first request message may be, for example, S-NSSAI, and the first request message may further include one or more of the identifier (for example, the SUPI) of the terminal device, the identifier (for example, the PDU session ID) of the first session, and subscribed bandwidth information (for example, a session-AMBR).

Step S1006: The policy control network element receives the first request message from the session management network element.

Step S1007: The policy control network element generates the first session policy control information based on the overflow indication.

Step S1008: The policy control network element sends a first response message to the session management network element. The first response message includes the first session policy control information.

Step S1009: The session management network element receives the first response message from the policy control network element.

Step S1010: The session management network element performs policy control on the first session based on the first session policy control information obtained from the first response message.

For an implementation of step S1001 to step S1010, refer to Embodiment 1. Details are not described herein again. It should be understood that in Embodiment 2, the policy control network element may also subscribe to an event that the terminal device, the first session, or the network slice cancels the overflow state from the session management network element. The session management network element may also perform steps such as subscribing to the slice access status information of the network slice and the event that the terminal device, the first session, or the network slice cancels the overflow state from the slice access control network element; determining, based on received updated slice access status information or an overflow state cancellation report, that the terminal device, the first session, or the network slice cancels the overflow state; requesting the policy control network element to update session policy control information; and performing policy control on the first session based on updated session policy control information. For implementations of these steps, refer to Embodiment 1.

It can be learned that according to the foregoing technical solution provided in this embodiment of this application, the session management network element may determine that the network slice is in the overflow state, and decide to allow the terminal device to initiate the first session in the overflow state. In this way, the session management network element may use the first request message to be sent to the policy control network element to carry the overflow indication that indicates that the terminal device or the first session accesses the network slice in the overflow state. Therefore, the policy control network element can formulate corresponding session policy control information for the first session established in the overflow state, to support the terminal device in establishing a session in the overflow state of the network slice, and fully utilize network resources.

Embodiment 3

An embodiment of this application further provides another slice control method. A main difference between this slice control method and the slice control methods provided in Embodiment 1 and Embodiment 2 lies in that a policy control network element may determine an overflow state of a network slice. A session establishment request message received by a session management network element from an access management network element and a first request message received by the policy control network element from the session management network element may not include an overflow indication. After receiving the first request message, the policy control network element may determine whether the network slice is in the overflow state, and generate corresponding policy control information.

Figure 11:
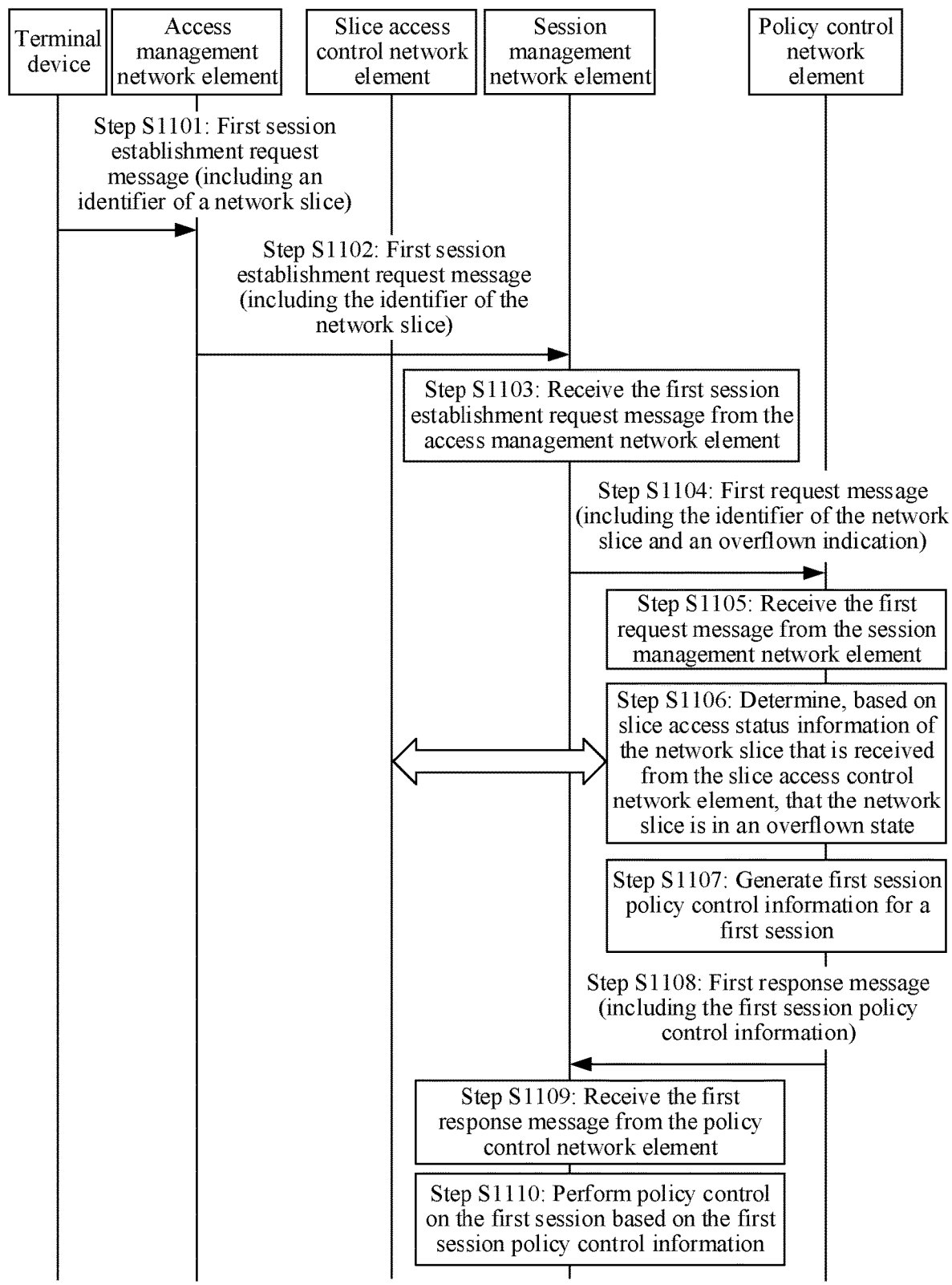
FIG. 11 is a flowchart of still another slice control method according to an embodiment of this application.

FIG. 11 is a flowchart of another slice control method according to an embodiment of this application. The method in this embodiment includes the following steps.

Step S1101: The access management network element receives a first session establishment request message from a terminal device. The first session establishment request message includes an identifier of the network slice, and the first session establishment request message is used to request to establish a first session of the terminal device.

After receiving the first session establishment request message from the terminal device, the access management network element may determine, based on the identifier (for example, S-NSSAI) of the network slice in the first session establishment request message, a network slice for the first session to be established.

Optionally, the first session establishment request message may include an identifier (for example, an SUPI) of the terminal device and/or an identifier (namely, a PDU session ID) of the first session.

Optionally, before step S1101, a general registration procedure of the terminal device may be further included. Details are not described in this application.

Step S1102: The access management network element sends the first session establishment request message to the session management network element.

Step S1103: The session management network element receives the first session establishment request message from the access management network element.

Step S1104: The session management network element sends a first request message to the policy control network element. The first request message includes the identifier of the network slice, and the first request message is used to request first session policy control information associated with the first session.

The first request message may also be referred to as a session management policy association establishment request message or a session management policy association update request message, or may have another name. This is not limited in this application.

Optionally, the identifier of the network slice in the first request message may be, for example, S-NSSAI. The first request message may further include one or more of the identifier (for example, the SUPI) of the terminal device, the identifier (for example, the PDU session ID) of the first session, and subscribed bandwidth information (for example, a session-AMBR).

Optionally, the first request message may further include an overflow indication, and the overflow indication indicates that the terminal device or the first session accesses the network slice in the overflow state.

Step S1105: The policy control network element receives the first request message from the session management network element.

Step S1106: The policy control network element determines, based on current slice access status information of the network slice that is received from a slice access control network element, that the network slice is currently in the overflow state.

In this embodiment of this application, after receiving the first request message from the session management network element, the policy control network element may obtain current slice access status information of the network slice from the slice access control network element, for example, a current quantity of terminal devices accessing in the network slice, a quantity of established session connections, a traffic bandwidth, and a terminal density. If one or more parameters (for example, a quantity of access terminals or a quantity of sessions) in the current slice access status information of the network slice exceed a corresponding maximum value allowed by configuration, the policy control network element may determine that the network slice is currently in the overflow state.

Step S1107: The policy control network element generates the first session policy control information for the first session in the network slice.

In this embodiment of this application, the policy control network element may make a policy decision based on information such as the overflow indication or the overflow state, the identifier (for example, an SUPI) of the terminal device, subscription configuration information of the network slice, and an operator configuration, and generate the first session policy control information. The first session policy control information may include session-level policy control information, a session rule, and may include flow-level policy control information, a PCC rule, which are respectively used to perform policy control for a session and a service flow. The policy control may include aspects such as QoS control (for example, a bandwidth and a scheduling priority), charging control (for example, a charging rate and a charging mode), and flow forwarding control (for example, target application access point information).

Step S1108: The policy control network element sends a first response message to the session management network element. The first response message includes the first session policy control information.

Step S1109: The session management network element receives the first response message from the policy control network element.

Step S1110: Perform policy control on the first session based on the first session policy control information in the first response message.

In this embodiment of this application, after the policy control network element determines that the network slice is in the overflow state, the policy control network element may further subscribe to slice access status information of the network slice from the slice access control network element. For example, the policy control network element may send a second subscription request to the slice access control network element. The second subscription request indicates the slice access control network element to send latest slice access status information to the policy control network element when an access status of the network slice changes. The policy control network element may further subscribe to an event that the terminal device, the first session, or the network slice cancels the overflow state from the slice access control network element.

Further, the policy control network element may determine, based on updated slice access status information of the network slice and/or an overflow state cancellation report that are/is received from the slice access control network element, that the overflow state of the network slice is canceled, and update session policy control information for the first session, and then send updated second session policy control information to the session management network element.

It can be learned that, according to the technical solution provided in this embodiment of this application, the policy control network element may determine that the network slice is in the overflow state, and formulate corresponding session policy control information for the first session initiated by the terminal device in the overflow state, to support the terminal device in establishing a session in the overflow state of the network slice, and effectively use network resources.

Embodiment 4

An embodiment of this application further provides another slice control method. A main difference between this slice control method and the slice control method provided in Embodiment 3 lies in that a policy control network element generates first session policy control information for a first session in a network slice, and the generation of the first session policy control information may not be triggered by a first request message sent by a session management network element. In other words, the policy control network element may directly determine, based on slice access status information of the network slice that is received from a slice access control network element, that the network slice is in an overflow state, and trigger generation of the first session policy control information for the first session that accesses the network slice in an overflow state.

In this way, after generating the first session policy control information, the policy control network element may send the first session policy control information to the session policy control network element corresponding to the first session. For example, the policy control network element may send a first notification message to the session management network element. The first notification message carries the first session policy control information. The first notification message may also be referred to as a session policy association update notification message (SMPolicyControl_UpdateNotify Request), or may have another name. This is not limited in this application.

It may be understood that the slice control method in Embodiment 4 may include only steps S1106 in Embodiment 3 and a subsequent update procedure of session policy control information.

It should be understood that, in this embodiment of this application, after generating the first session policy control information associated with the first session, the policy control network element may send a first message to the session policy control network element corresponding to the first session, and the first message carries the first session policy control information. The first message may be a first response message or a first notification message. When the generation of the first session policy control information by the policy control network element is triggered by the first request message sent by the session management network element, the first message is a first response message. When the generation of the first session policy control information by the policy control network element is triggered by slice access status information of the network slice received from the slice access control network element, the first message is a first notification message.

Figure 12:
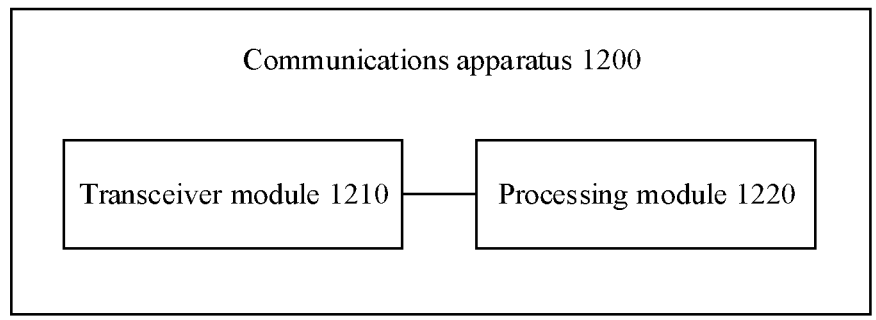
FIG. 12 is a diagram of a communications apparatus according to an embodiment of this application.

Embodiments of this application provide a communications apparatus. FIG. 12 is a diagram of a communications apparatus according to an embodiment of this application. The communications apparatus 1200 includes a transceiver module 1210 and a processing module 1220. The communications apparatus may be configured to implement a function of the session management network element in any one of the foregoing method embodiments, or a function of the policy control network element in any one of the foregoing method embodiments, or a function of the access management network element in any one of the foregoing method embodiments. For example, the communications apparatus may be an SMF network element, a PCF network element, or an AMF network element in a core network. The network element or network function may be a network element in a hardware device, may be a software function running on dedicated hardware, or may be a virtualization function instantiated on a platform (for example, a cloud platform).

When the communications apparatus is used as a session management network element to perform the method shown in FIG. 3. The transceiver module 1210 is configured to send a first request message to a policy control network element, where the first request message includes an identifier of a network slice and an overflow indication, the overflow indication indicates that a terminal device or a first session accesses the network slice in an overflow state, and the first request message is used to request first session policy control information associated with the first session. The transceiver module 1210 is further configured to receive a first response message from the policy control network element, where the first response message includes the first session policy control information. The processing module 1220 is configured to perform policy control on the first session based on the first session policy control information.

In an embodiment, the transceiver module 1210 is further configured to receive current slice access status information of the network slice from a slice access control network element. The processing module 1220 is further configured to determine, based on the slice access status information, that the network slice is currently in an overflow state.

In an embodiment, the transceiver module 1210 is further configured to receive a session establishment request message from an access management network element, where the session establishment request message includes the identifier of the network slice and the overflow indication.

In an embodiment, the first response message may further include a first subscription request, and the first subscription request is used to subscribe to an event that the terminal device, the first session, or the network slice cancels the overflow state.

In an embodiment, the transceiver module 1210 is further configured to send a second request message to the policy control network element, where the second request message includes a report of the event that the terminal device, the first session, or the network slice cancels the overflow state, and the second request message is used to request second session policy control information associated with the first session; and receive a second response message from the policy control network element, where the second response message includes the second session policy control information. The processing module 1220 is further configured to perform policy control on the first session based on the received second session policy control information.

In an embodiment, the transceiver module 1210 is further configured to receive updated slice access status information of the network slice and/or the report of the overflow state cancellation event from the slice access control network element. The processing module 1220 is further configured to determine, based on the updated slice access status information of the network slice and/or the report of the overflow state cancellation event, that the terminal device, the first session, or the network slice cancels the overflow state.

In an embodiment, the transceiver module 1210 is further configured to send the first subscription request to the access management network element, and receive the report of the overflow state cancellation event from the access management network element.

In an embodiment, the slice access status information of the network slice includes one or more pieces of information in the following: a quantity of terminal devices accessing the network slice, a quantity of sessions established in the network slice, a traffic bandwidth of the network slice, and a terminal density in the network slice.

When the communications apparatus is used as a policy control network element to perform the method shown in FIG. 3, the transceiver module 1210 is configured to receive a first request message from a session management network element, where the first request message includes an identifier of a network slice and an overflow indication, and the overflow indication indicates that a terminal device or a first session accesses the network slice in an overflow state. The processing module 1220 is configured to generate, based on the overflow indication, first session policy control information associated with the first session. The transceiver module 1210 is further configured to send a first response message to the session management network element, where the first response message includes the first session policy control information.

In an embodiment, the first response message may further include a first subscription request, and the first subscription request is used to subscribe to an event that the terminal device, the first session, or the network slice cancels the overflow state; or the transceiver module 1210 is further configured to send the first subscription request to a slice access control network element.

In an embodiment, the transceiver module 1210 is further configured to receive a report of the event that the terminal device, the first session, or the network slice cancels the overflow state from the session management network element or the slice access control network element. Then, the processing module 1220 is further configured to generate second session policy control information associated with the first session, and send the second session policy control information to the session management network element through the transceiver module 1210.

When the communications apparatus is used as an access management network element to perform the method shown in FIG. 3, the transceiver module 1210 is configured to receive a first session establishment request message from a terminal device, where the first session establishment request message includes an identifier of a network slice, and the first session establishment request message is used to request to establish a first session of the terminal device. The processing module 1220 is configured to determine that the network slice is currently in an overflow state. The transceiver module 1210 is further configured to send a second session establishment request message to a session management network element, where the second session establishment request message includes the identifier of the network slice and an overflow indication, the second session establishment request message is used to request to establish the first session of the terminal device, and the overflow indication indicates that the terminal device or the first session accesses the network slice in an overflow state.

In an embodiment, that the processing module 1220 determines that the network slice is currently in an overflow state may be: determining, based on current slice access status information of the network slice received from a slice access control network element, that the network slice is currently in the overflow state; or determining, based on a stored overflow state flag corresponding to the network slice, that the network slice is currently in the overflow state.

In an embodiment, the transceiver module 1210 is further configured to receive a first subscription request from the session management network element, where the first subscription request is used to subscribe to an event that the terminal device, the first session, or the network slice cancels the overflow state. Correspondingly, after the processing module 1220 determines that the terminal device, the first session, or the network slice cancels the overflow state, the transceiver module 1210 is further configured to send an overflow state cancellation report to the session management network element.

In an embodiment, that the processing module 1220 determines that the terminal device, the first session, or the network slice cancels the overflow state may be: receiving updated slice access status information of the network slice from the slice access control network element through the transceiver module 1210, and determining, by the processing module 1220 based on the updated slice access status information of the network slice, that the terminal device, the first session, or the network slice cancels the overflow state; or receiving the report of the overflow state cancellation event from the slice access control network element through the transceiver module 1210, and determining, by the processing module 1220 based on the report of the overflow state cancellation event, that the terminal device, the first session, or the network slice cancels the overflow state; or determining, by the processing module 1220 based on a quantity of terminal devices accessing the network slice in a current area, that the terminal device, the first session, or the network slice cancels the overflow state.

In an embodiment, the transceiver module 1210 is further configured to receive a registration request message from the terminal device, where the registration request message includes an identifier of a network slice that the terminal device requests to access. The processing module 1220 is further configured to determine, based on the current slice access status information of the network slice that is received from the slice access control network element, that the network slice is currently in the overflow state, and decide, based on the current slice access status information of the network slice, a network load status of the current area, and slice customer subscription, to allow the terminal device to access the network slice. The transceiver module 1210 is further configured to send a registration accept message to the terminal device.

In an embodiment, the processing module 1220 is further configured to: after determining that the network slice is currently in the overflow state, store the overflow state flag corresponding to the network slice; and/or the transceiver module 1210 is further configured to send a second subscription request to the slice access control network element, where the second subscription request indicates the slice access control network element to send latest slice access status information of the network slice to the access management network element when an access status of the network slice changes.

In an embodiment, the slice access status information of the network slice includes one or more pieces of information in the following: a quantity of terminal devices accessing the network slice, a quantity of sessions established in the network slice, a traffic bandwidth of the network slice, and a terminal density in the network slice.

It should be noted that the processing module 1220 in the communications apparatus 1200 may be implemented by a processor or a processor-related circuit component, and may be a processor or a processing unit. The transceiver module 1210 may be implemented by a transceiver or a transceiver-related circuit component, and may be a transceiver or a transceiver unit.

Figure 13:
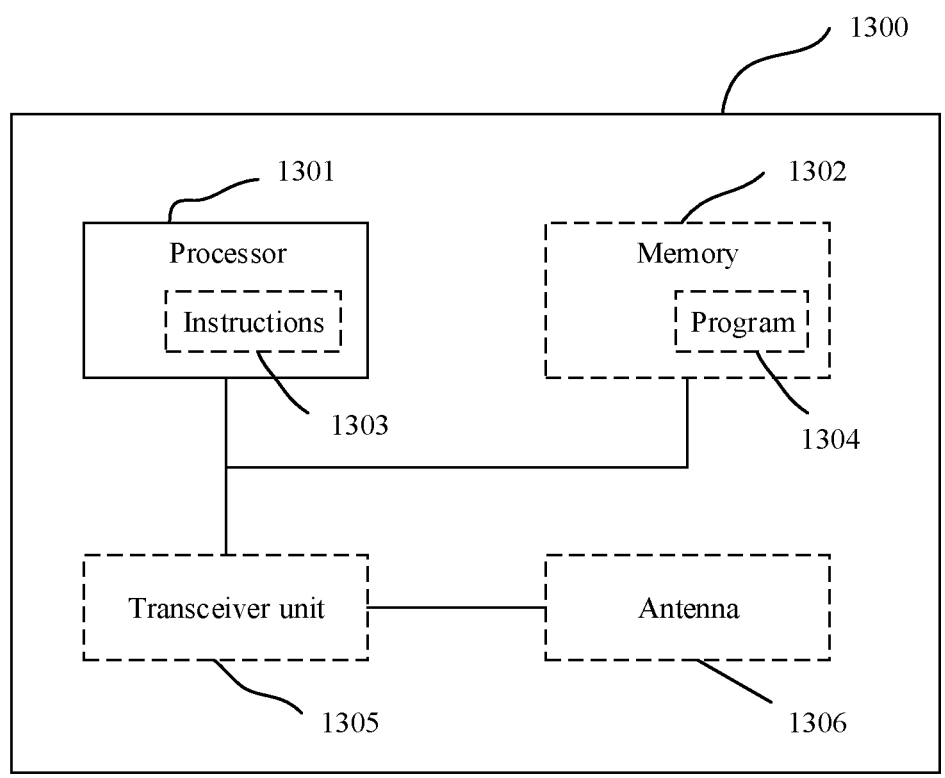
FIG. 13 is a diagram of a communications apparatus according to an embodiment of this application.

FIG. 13 is a diagram of a communications apparatus according to an embodiment of this application. The communications apparatus 1300 may be configured to implement the methods described in the foregoing method embodiments. The communications apparatus 1300 may be a chip or a network device.

The communications apparatus 1300 includes one or more processors 1301. The one or more processors 1301 may support the communications apparatus 1300 in implementing the method of the first core network element, the second core network element, or the third core network element in FIG. 3 to FIG. 11. The processor 1301 may be a general-purpose processor, a dedicated processor, or the like. For example, the processor 1301 may be a central processing unit (CPU) or a baseband processor. The baseband processor may be configured to process communication data. The CPU may be configured to control the communications apparatus (for example, the network device, the terminal device, or the chip) to execute a software program and process data of the software program. The communications apparatus 1300 may further include a transceiver unit 1305, configured to input (receive) and output (send) a signal.

For example, the communications apparatus 1300 may be the chip, and the transceiver unit 1305 may be an input and/or output circuit of the chip, or the transceiver unit 1305 may be a communications interface of the chip. The chip may be used as a component of a terminal device, a network device, or another wireless communications device.

The communications apparatus 1300 may include one or more memories 1302. The memory 1302 stores a program 1304, and the program 1304 may be run by the processor 1301 to generate instructions 1303, so that the processor 1301 performs, according to the instructions 1303, the methods described in the foregoing method embodiments. Optionally, the memory 1302 may further store data. Optionally, the processor 1301 may further read the data stored in the memory 1302. The data and the program 1304 may be stored in a same storage address, or the data and the program 1304 may be stored in different storage addresses.

The processor 1301 and the memory 1302 may be disposed separately, or may be integrated together, for example, integrated on a board or integrated into a system on chip (SOC).

Optionally, the communications apparatus 1300 may further include a transceiver unit 1305 and an antenna 1306. The transceiver unit 1305 may be referred to as a transceiver, a transceiver circuit, or the like, and is configured to implement sending and receiving functions of the communications apparatus by using the antenna 1306.

It should be understood that steps in the foregoing method embodiments may be implemented by a logic circuit in a form of hardware or instructions in a form of software in the processor 1301. The processor 1301 may be a CPU, a digital signal processor (DSP), an application specific integrated circuit (ASIC), a field programmable gate array (FPGA), or another programmable logic device, for example, a discrete gate, a transistor logic device, or a discrete hardware component.

Embodiments of this application further provide a chip system, including a processor, where the processor is coupled to a memory. The memory is configured to store a program or instructions. When the program or the instructions is/are executed by the processor, the chip system is enabled to implement the method in any one of the foregoing method embodiments.

Optionally, there may be one or more processors in the chip system. The processor may be implemented by hardware, or may be implemented by software. When the processor is implemented by the hardware, the processor may be a logic circuit, an integrated circuit, or the like. When the processor is implemented by the software, the processor may be a general-purpose processor, and is implemented by reading software code stored in the memory.

Optionally, there may be one or more memories in the chip system. The memory may be integrated with the processor, or may be disposed separately from the processor. This is not limited in this application. For example, the memory may be a non-transitory processor such as a read-only memory ROM. The memory and the processor may be integrated into a same chip, or may be separately disposed on different chips. A type of the memory and a manner of disposing the memory and the processor are not limited in this application.

For example, the chip system may be a FPGA, an ASIC, a SoC, CPU, a network processor (NP), a digital signal processor (DSP), a micro controller unit (MCU), or a programmable logic device (PLD) or another integrated chip.

It should be understood that steps in the foregoing method embodiments may be implemented by a hardware integrated logic circuit in the processor or instructions in a form of software. The steps of the method disclosed with reference to embodiments of this application may be directly performed and completed by a hardware processor, or may be performed and completed by using a combination of hardware in the processor and a software module.

Embodiments of this application further provide a computer-readable storage medium. The computer storage medium stores computer-readable instructions. When a computer reads and executes the computer-readable instructions, the computer is enabled to perform the method in any one of the foregoing method embodiments.

Embodiments of this application further provide a computer program product. When a computer reads and executes the computer program product, the computer is enabled to perform the method in any one of the foregoing method embodiments.

Embodiments of this application further provide a communications system. The communications system includes a session management network element, a policy control network element, and an access management network element. Further, the communications system may further include a slice access control network element. Optionally, the communications system may further include an access network device and a terminal device.

It should be understood that, the processor mentioned in embodiments of this application may be a CPU, the processor may further be another general-purpose processor, a DSP, an ASIC, a FPGA, or another programmable logic device, discrete gate or transistor logic device, discrete hardware component, or the like. The general-purpose processor may be a microprocessor, or the processor may be any conventional processor or the like.

It should be further understood that the memory described in embodiments of this application may be a volatile memory or a non-volatile memory, or may include both a volatile memory and a non-volatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), which is used as an external cache. By way of example and not limitation, many forms of RAMs may be used, for example, a static random access memory (SRAM), a dynamic random access memory (DRAM), a synchronous dynamic random access memory (DRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM).

It should be noted that, when the processor is a general-purpose processor, a DSP, an ASIC, an FPGA or another programmable logic device, a discrete gate, a transistor logic device, or a discrete hardware component, the memory (storage module) is integrated into the processor.

It should be noted that the memory described in this specification is intended to include but not limited to these memories and any memory of another appropriate type.

It should be understood that sequence numbers of the foregoing processes do not mean execution sequences in various embodiments of this application. The execution sequences of the processes should be determined based on functions and internal logic of the processes, and should not be construed as any limitation on implementation processes of embodiments disclosed herein.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that such an implementation goes beyond the scope of this application.

A person skilled in the art may clearly understand that, for the purpose of convenient and brief description, for detailed working processes of the foregoing system, apparatus, and unit, refer to corresponding processes in the foregoing method embodiments, and details are not described herein again.

In the several embodiments provided in this application, it should be understood that the disclosed system, apparatus, and method may be implemented in other manners. For example, the described apparatus embodiments are merely examples. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in an electrical form, a mechanical form, or another form.

The units described as separate parts may or may not be physically separate, and parts displayed as units may or may not be physical units, may be located in one location, or may be distributed on a plurality of network units. Some or all of the units may be selected based on actual requirements to achieve the objective of the solutions of embodiments.

In addition, function units in embodiments of this application may be integrated into one processing unit, or each of the units may exist alone physically, or two or more units are integrated into one unit.

When the functions are implemented in a form of a software function unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for indicating a computer device (which may be a personal computer, a server, or a network device) to perform all or a part of the steps of the methods described in embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely implementations of this application, and are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A slice control method, the method comprising:
subscribing to a slice access control network element, by a policy control network element, for slice access status information of a network slice;
receiving, by the policy control network element from the slice access control network element, the slice access status information of the network slice;
determining, by the policy control network element based on the slice access status information of the network slice, that a network slice traffic bandwidth utilized by the network slice exceeds a corresponding bandwidth maximum value allowed by configuration;
generating, by the policy control network element in response to the determining, first session policy control information for a first session in the network slice; and
sending, by the policy control network element, the first session policy control information to a session management network element corresponding to the first session, the first session policy control information being for policy control on the first session.

2. The method according to claim 1, further comprising:
receiving, by the policy control network element from the session management network element, a first request message, wherein the first request message comprises an identifier of the network slice.

3. The method according to claim 2, wherein the first request message requests the first session policy control information associated with the first session.

4. The method according to claim 2, wherein the first request message is a session management policy association establishment request message.

5. The method according to claim 2, wherein the first request message further comprises an identifier of a terminal device.

6. The method according to claim 2, wherein the first request message further comprises an identifier of the first session.

7. The method according to claim 1, further comprising:
receiving, by the session management network element, the first session policy control information from the policy control network element; and performing, by the session management network element, the policy control on the first session based on the first session policy control information.

8. A communications apparatus, comprising:
a transceiver configured to receive, from a slice access control network element, slice access status information of a network slice;
a processor configured to:
subscribe to the slice access control network element for the slice access status information of the network slice;
determine, based on the slice access status information of the network slice, that a network slice traffic bandwidth utilized by the network slice exceeds a corresponding maximum bandwidth value allowed by configuration; and
generate, in response to the determination, first session policy control information for a first session in the network slice; and
the transceiver is further configured to send the first session policy control information to a session management network element corresponding to the first session, the first session policy control information being for policy control on the first session.

9. The communications apparatus according to claim 8, wherein the transceiver is further configured to receive, from the session management network element, a first request message, wherein the first request message comprises an identifier of the network slice.

10. The communications apparatus according to claim 9, wherein the first request message requests the first session policy control information associated with the first session.

11. The communications apparatus according to claim 9, wherein the first request message is a session management policy association establishment request message.

12. The communications apparatus according to claim 9, wherein the first request message further comprises an identifier of a terminal device.

13. The communications apparatus according to claim 9, wherein the first request message further comprises an identifier of the first session.

14. A communications system, comprising:
a policy control network element configured to:
subscribe to a slice access control network element, by a policy control network element, for slice access status information of a network slice;
receive, from the slice access control network, the slice access status information of the network slice;
determine, based on the slice access status information of the network slice, that a network slice traffic bandwidth utilized by the network slice exceeds a corresponding maximum bandwidth value allowed by configuration;
generate, in response to the determination, first session policy control information for a first session in the network slice;
send the first session policy control information; and
a session management network element corresponding to the first session, the session management network element being configured to:
receive the first session policy control information from the policy control network element; and
perform policy control on the first session based on the first session policy control information.

15. The communications system according to claim 14, wherein the transceiver is further configured to receive, from the session management network element, a first request message, wherein the first request message comprises an identifier of the network slice.

16. The communications system according to claim 15, wherein the first request message is a session management policy association establishment request message.

17. The communications system according to claim 15, wherein the first request message further comprises an identifier of a terminal device and an identifier of the first session.

* * * * *